US011922822B2

(12) United States Patent
Torok et al.

(10) Patent No.: US 11,922,822 B2
(45) Date of Patent: Mar. 5, 2024

(54) METHOD OF SCORING A MOVE OF A USER AND SYSTEM THEREOF

(71) Applicant: AGT INTERNATIONAL GMBH, Zurich (CH)

(72) Inventors: Agoston Torok, Darmstadt (DE); Michael Leigsnering, Muhltal (DE); Juergen Hahn, Darmstadt (DE); Roel Heremans, Darmstadt (DE); Peter Weidenkaff, Wiesbaden (DE)

(73) Assignee: AGT INTERNATIONAL GMBH, Zurich (CH)

( * ) Notice: Subject to any disclaimer, the term of this patent is extended or adjusted under 35 U.S.C. 154(b) by 0 days.

(21) Appl. No.: 18/247,501

(22) PCT Filed: Feb. 3, 2021

(86) PCT No.: PCT/IL2021/050129
§ 371 (c)(1),
(2) Date: Mar. 31, 2023

(87) PCT Pub. No.: WO2022/070175
PCT Pub. Date: Apr. 7, 2022

(65) Prior Publication Data
US 2023/0274660 A1  Aug. 31, 2023

Related U.S. Application Data

(60) Provisional application No. 63/086,360, filed on Oct. 1, 2020.

(51) Int. Cl.
*G09B 19/00* (2006.01)
*A63B 71/06* (2006.01)
(Continued)

(52) U.S. Cl.
CPC ........ *G09B 19/003* (2013.01); *A63B 71/0622* (2013.01); *G06V 10/761* (2022.01);
(Continued)

(58) Field of Classification Search
CPC .. G09B 19/003; G09B 19/0038; G06V 20/46; A63B 24/0068
See application file for complete search history.

(56) References Cited

U.S. PATENT DOCUMENTS 6,293,802 B1 *  9/2001  Ahlgren ................... G09B 5/02
434/257
8,702,485 B2     4/2014  Flury et al.
(Continued)

*Primary Examiner* — Peter R Egloff
(74) *Attorney, Agent, or Firm* — Browdy and Neimark, PLLC

(57) ABSTRACT

According to one aspect of the presently disclosed subject there is provided a computerized method for scoring performance of a move of a trainee in a trainee frame input in relation to a move of a trainer in a trainer video wherein the trainer move includes at least one trainer keyframe. The method comprising obtaining a trainee frame input comprising a trainee move, the trainee move comprising a plurality of trainee frames, based on the at least one trainer keyframe, processing the plurality of trainee frames to provide a move performance score, indicative of the performance of the trainee move in relation to the trainer move, with respect to (Continued)

at least one aspect of the performance. In some examples, the aspects can be one of a similarity aspect, a timing aspect, or a motion dynamics aspect or a combination thereof.

20 Claims, 14 Drawing Sheets

(51) Int. Cl.
  *G06V 10/74* (2022.01)
  *G06V 20/40* (2022.01)
  *G06V 40/20* (2022.01)
  *A63B 24/00* (2006.01)

(52) U.S. Cl.
  CPC .............. *G06V 20/46* (2022.01); *G06V 20/48* (2022.01); *G06V 40/23* (2022.01); *A63B 2024/0068* (2013.01); *A63B 2071/0638* (2013.01); *A63B 2220/05* (2013.01); *A63B 2220/62* (2013.01); *A63B 2220/806* (2013.01); *A63B 2244/22* (2013.01); *G09B 19/0015* (2013.01)

(56) References Cited

U.S. PATENT DOCUMENTS

| | | | |
|---|---|---|---|
| 11,071,887 B2* | 7/2021 | Katis, Jr. | G16H 20/60 |
| 11,273,342 B2* | 3/2022 | Mao | G06V 20/46 |
| 11,645,873 B1* | 5/2023 | Lui | G06V 40/23 |
| | | | 434/252 |
| 2012/0143358 A1* | 6/2012 | Adams | G06F 3/0482 |
| | | | 700/92 |
| 2012/0190505 A1 | 7/2012 | Shavit | |
| 2014/0336796 A1* | 11/2014 | Agnew | G09B 5/00 |
| | | | 700/91 |
| 2016/0042652 A1 | 2/2016 | Nagai et al. | |
| 2018/0353836 A1* | 12/2018 | Li | A63B 71/06 |
| 2018/0357472 A1 | 12/2018 | Dressen | |
| 2019/0019321 A1* | 1/2019 | Thielen | G09B 19/0038 |
| 2019/0247716 A1 | 8/2019 | Chuang | |
| 2019/0362139 A1* | 11/2019 | Mehl | A61B 5/486 |
| 2021/0113889 A1* | 4/2021 | Mao | A63B 24/0062 |
| 2022/0057856 A1* | 2/2022 | Sankhla | G06T 7/70 |

* cited by examiner

| Time in video | 00:01 | 00:02 | 00:03 | 00:04 | 00:05 | 00:06 | 00:07 | 00:08 |
|---|---|---|---|---|---|---|---|---|
| trainer keyframes ID | | | KF1 | | | KF2 | | |
| user frame ID | F3 | F4 | F5 | F6 | F7 | F8 | F9 | F10 |
| similarity score for KF 1 | 0.4 | 0.4 | 0.4 | 0.4 | 0.7 | | | |
| similarity score for KF 2 | | | | 0.8 | 0.1 | 0.1 | 0.1 | 0.1 |

Trainer move
Trainee move time window w1
time window w2

| Time in video | 00:01 | 00:02 | 00:03 | 00:04 | 00:05 | 00:06 | 00:07 | 00:08 |
|---|---|---|---|---|---|---|---|---|
| trainer keyframes ID | | | KF1 | | | KF2 | | |
| user frame ID | F3 | F4 | F5 | F6 | F7 | F8 | F9 | F10 |
| similarity score for KF1 | 0.4 | 0.4 | 0.4 | 0.4 | 0.7 | 0.1 | 0.1 | 0.1 |
| similarity score for KF2 | | | | 0.8 | 0.1 | | | |

|  | F3 | F4 | F5 | F6 | F7 | F8 | F9 | F10 |
|---|---|---|---|---|---|---|---|---|
| F3 | n.a | n.a | n.a | 1.2 | 0.5 | 0.5 | 0.5 | 0.5 |
| F4 | n.a | n.a | n.a | 1.2 | 0.5 | 0.5 | 0.5 | 0.5 |
| F5 | n.a | n.a | n.a | 1.2 | 0.5 | 0.5 | 0.5 | 0.5 |
| F6 | n.a | n.a | n.a | 0.5 | 0.5 | 0.5 | 0.5 | 0.5 |
| F7 | n.a | n.a | n.a | out-of-sync constraint | coincidence constraint | 0.8 | 0.8 | 0.8 |
| F8 | n.a | n.a | n.a | n.a | n.a | n.a | n.a | n.a |
| F9 | n.a | n.a | n.a | n.a | n.a | n.a | n.a | n.a |
| F10 | n.a | n.a | n.a | n.a | n.a | n.a | n.a | n.a |

*Fig 10*

| Time in video | 00:01 | 00:02 | 00:03 | 00:04 | 00:05 | 00:06 | 00:07 | 00:08 |
|---|---|---|---|---|---|---|---|---|
| trainer keyframes ID | | | KF 1 | | | KF 2 | | |
| trainee frame ID | F3 | F4 | F5 | F6 | F7 | F8 | F9 | F10 |
| similarity score for KF1 | 0.4 | 0.4 | 0.4 | 0.4 | 0.7 | 0.1 | 0.1 | 0.1 |
| similarity score for KF2 | 0 | 0.5 | | 0.8 | 0.1 | | | |
| motion magnitude similarity score for trainee | 0 | 0.5 | 0.4 | 0.3 | 0 | 0.2 | 0.1 | 0.1 |
| similarity score for KF1 + motion magnitude similarity | 0.4 | 0.9 | 0.8 | 0.7 | 0.7 | | | |
| similarity score for KF2 + motion magnitude similarity | | | | 1.1 | 0.1 | 0.3 | 0.2 | 0.2 |

METHOD OF SCORING A MOVE OF A USER AND SYSTEM THEREOF

TECHNICAL FIELD

The presently disclosed subject matter relates to monitoring a move of a user and, more particularly, to scoring and providing feedback on a move of a user.

BACKGROUND

In a computerized process of training a user to perform certain moves, such as a user that wishes to learn a certain dance from a dancing teacher, the user watches the dancing teacher and performs the move. Performance of the moves is tracked, e.g. by a camera or sensors attached to the user, processed, and then feedback of the performed moves is provided to the user. In some known solutions, the system provides feedback to the user by reporting a set of measurements relating to the move performed by the user. However, in many known systems, interpreting the measurements and deciding how exactly the move performance should be improved, is left to the user. Hence, it is desired to provide the user with feedback that is accepted and interpreted in a more efficient manner, such that the feedback includes guidelines on how the move was performed, and what part of the move should be improved.

SUMMARY OF THE INVENTION

In accordance with an aspect of the presently disclosed subject matter, there is provided a computerized method for scoring performance of a move of a trainee in a trainee frame input in relation to a move of a trainer in a trainer video, wherein the trainer move includes at least one trainer keyframe, the method comprising:
  obtaining a trainee frame input comprising a trainee move, the trainee move comprising a plurality of trainee frames;
  based on the at least one trainer keyframe, processing the plurality of trainee frames to provide a move performance score, indicative of the performance of the trainee move in relation to the trainer move, with respect to at least one aspect of the performance, the processing comprising:
    selecting for the at least one trainer keyframe, according to a selection criterion, at least one trainee frame of the plurality trainee frames that correspond to the at least one trainer keyframe, giving rise to at least one candidate;
    based on the at least one trainer keyframe and the at least one candidate, calculating at least one aspect score of the at least one aspect; and
    transforming the at least one calculated aspect score, giving rise to the move performance score; and
    based on the move performance score, providing feedback to the trainee;
    whereby, the provided feedback facilitates the trainee to improve performance of a future move with respect to the trainer move.

In addition to the above features, the computerized method according to this aspect of the presently disclosed subject matter can comprise one or more of features (i) to (xix) listed below, in any desired combination or permutation which is technically possible:
  (i) wherein the selection criterion is a time criterion, and wherein selecting the at least one trainee frame comprises selecting at least one trainee keyframe in a time window in the trainee frame input that is around a time point of the at least one trainer keyframe in the trainer video;
  (ii) wherein the at least one aspect is a similarity aspect, and wherein the at least one trainer keyframe includes body parts of the trainer and the at least one candidate include body parts of the trainee, and wherein calculating the similarity aspect score further comprises:
    computing at least one angular difference between at least one body part included in the at least one trainer keyframe and at least one corresponding body part included in the at least one candidate; and
    calculating the similarity aspect score, based on the computed at least one angular difference;
  (iii) wherein computing the angular differences comprises computing at least one parameter selected from a group of parameters comprising: absolute angular difference, cosine distance, and a learned distance;
  (iv) wherein the at least one trainer keyframe is associated with a predefined keyframe format, the method further comprising:
    pre-processing the at least one candidate in accordance with the predefined keyframe format, giving rise to at least one formatted candidate, such that the at least one formatted candidate is formatted according to the predefined format; and
    computing the angular differences between the body parts in the at least one trainer keyframe and body parts in the at least one formatted candidate;
  (v) wherein at least one body part of the at least one body part of the trainer is associated with a respective weight, and wherein the method further comprises:
    computing the angular difference between the at least one body part and at least one corresponding body part of the trainee; and
    associating the computed angular difference with the respective weight; and
    calculating the similarity aspect score, based on the computed angular difference, according to the associated respective weight;
  (vi) wherein at least one body part is associated with a zero weight.
  (vii) wherein the trainer move includes at least two trainer keyframes, wherein the at least one aspect is a timing aspect pertaining to at least two trainer keyframes, and wherein prior to calculating the timing aspect score, the method further comprises:
    obtaining, for each of the at least two candidates, a respective matching score, the matching score being indicative of a likelihood of match between a candidate and a trainer keyframe; and
    wherein calculating the timing aspect score further comprises:
      based on a trainer time interval in the trainer video, the trainer time interval includes the at least two trainer keyframes, determining a corresponding trainee time interval in the trainee frame input, the corresponding trainee time interval including at least two successive candidates having respective matching scores, and
      calculating a timing score for the at least two successive candidates, with respect to one or more timing parameters;
      wherein transforming the calculated timing score further comprises fusing the matching scores and the calculated respective timing score of the candidates, giving rise to the move performance score;

(viii) wherein the timing parameter is an out-of-sync parameter pertaining to an order of appearance of the at least two trainee frames in the sequence when compared to an order of appearance of the at least two trainer keyframes, and wherein calculating the respective timing score further comprises:
determining, for at least two trainee frames of the sequence of keyframes, an out-of-sync parameter score, and
calculating the timing score of each respective trainee frame based on at least the determined out-of-sync parameter scores;
(ix) wherein the timing parameter is a time offset parameter, wherein a time offset that pertains to an offset between a time that a trainer keyframe appears in the trainer video, and a time that the candidate appears in the trainee frame input, and wherein calculating the respective timing score further comprises:
determining, for a trainer keyframe and a corresponding candidate, a time offset; and
calculating the timing score based on the determined time offset scores;
(x) wherein the at least one matching score is a similarity aspect score;
(xi) wherein the at least one matching score is a motion dynamics score;
(xii) wherein the at least one matching score is an aggregation of the similarity aspect score and a motion dynamics score;
(xiii) wherein calculating the timing score is based on at least two timing parameters, wherein at least one of the timing parameters is associated with a weight, and wherein calculating the timing score further comprises calculating the timing score based on the associated weight;
(xiv) wherein prior to fusing the matching score and the timing score, the method further comprises:
with respect to at least one candidate of the at least two successive candidates, aggregating the obtained matching score and the calculated timing score of the candidates to provide an aggregated optimality score;
for at least one trainer keyframe, selecting a matching trainee frame by selecting one candidate having a highest aggregated optimality score; and
fusing the matching score and the timing score of the matching trainee frames, giving rise to a move performance score;
(xv) wherein the trainer move includes at least two trainer keyframes, and wherein the at least one aspect being a motion dynamics aspect, and wherein:
based on a trainer time interval included in the trainer video, the trainer time interval includes the at least two trainer keyframes, determining a corresponding trainee time interval in the trainee frame input, the determined corresponding trainee time interval including at least two trainee frames;
based on at least one motion feature extracted from the at least two trainer keyframes included in the trainer time interval, determining a motion dynamics score for the at least two trainee frames;
wherein the at least one motion feature is indicative of movement transformation between two keyframes;
(xvi) at least one trainer keyframe of the at least two trainer keyframes is associated with a respective matching trainee frame, and wherein the determined corresponding trainee time interval includes at least one matching trainee frame to the at least two trainer keyframes;
(xvii) wherein each of the trainer and corresponding trainee time intervals is associated with a window size, wherein the window size associated with the corresponding trainee time interval is different to the window size associated with the trainer time interval;
calculating a difference between the window sizes of the trainer and corresponding trainee time intervals;
normalizing the trainee frames included in the trainee time interval in accordance with the calculated difference; and
determining the at least one motion feature in the normalized trainee frames.
(xviii) wherein the at least one motion feature is selected from a group of features comprising: peak motion feature, velocity motion feature, pose motion feature, relative change motion feature, and turn motion feature;
(xix) wherein processing the plurality of trainee frames to provide the move performance score is done with respect to at least first and second aspects, and wherein transforming the at least first and second calculated aspect scores further comprises:
for at least the first calculated aspect score of the first aspect, determining a respective transformation function, the transformation function being determined based on one or more conditions pertaining at least to the second calculated aspect score of the second aspect; and
fusing the at least first and second aspects scores, based on the respective transformation functions, giving rise to the move performance score;

According to another aspect of the presently disclosed subject matter, there is provided a system for scoring performance of a move of a trainee in a trainee frame input in relation to a move of a trainer in a trainer video, wherein the trainer move includes at least one trainer keyframe, by a processor and memory circuitry (PMC), the processor being configured to:
obtain a trainee frame input comprising a trainee move, the trainee move comprising a plurality of trainee frames;
based on the at least one trainer keyframes, process the plurality of trainee frames to provide a move performance score, indicative of the performance of the trainee move in relation to the trainer move, with respect to at least one aspect of the performance, the process comprising:
selecting for the at least one trainer keyframe, according to a selection criterion, at least one trainee frame of the plurality trainee frames that correspond to the at least one trainer keyframe, giving rise to at least one candidate;
based on the at least one trainer keyframe and the at least one candidate, calculate at least one aspect score of the at least one aspect; and
transform the at least one calculated aspect score, giving rise to the move performance score; and
based on the move performance score, provide feedback to the trainee;
whereby, the provided feedback facilitates the trainee to improve performance of a future move with respect to the trainer move.

According to another aspect of the presently disclosed subject matter, there is yet further provided a non-transitory computer readable storage medium tangibly embodying a program of instructions that, when executed by a computer, cause the computer to perform a method for scoring performance of a move of a trainee in a trainee frame input in relation to a move of a trainer in a trainer video, wherein the trainer move includes at least one trainer keyframe, the method comprising:

obtaining a trainee frame input comprising a trainee move, the trainee move comprising a plurality of trainee frames;

based on the at least one trainer keyframe, processing the plurality of trainee frames to provide a move performance score, indicative of the performance of the trainee move in relation to the trainer move, with respect to at least one aspect of the performance, the processing comprising:

selecting for the at least one trainer keyframe, according to a selection criterion, at least one trainee frame of the plurality trainee frames that correspond to the at least one trainer keyframe, giving rise to at least one candidate;

based on the at least one trainer keyframe and the at least one candidate, calculating at least one aspect score of the at least one aspect; and transforming the at least one calculated aspect score, giving rise to the move performance score; and based on the move performance score, providing feedback to the trainee;

whereby the provided feedback facilitates the trainee to improve performance of a future move with respect to the trainer move.

BRIEF DESCRIPTION OF THE DRAWINGS

In order to understand the invention and to see how it can be carried out in practice, embodiments will be described, by way of non-limiting examples, with reference to the accompanying drawings, in which:

FIG. 7 illustrates other exemplary timelines of the trainer keyframes and the trainee frames in the respective videos, in accordance with certain embodiments of the presently disclosed subject matter;

FIG. 10 illustrates an exemplary matrix of timing scores, in accordance with certain embodiments of the presently disclosed subject matter;

DETAILED DESCRIPTION

Figure 1A:
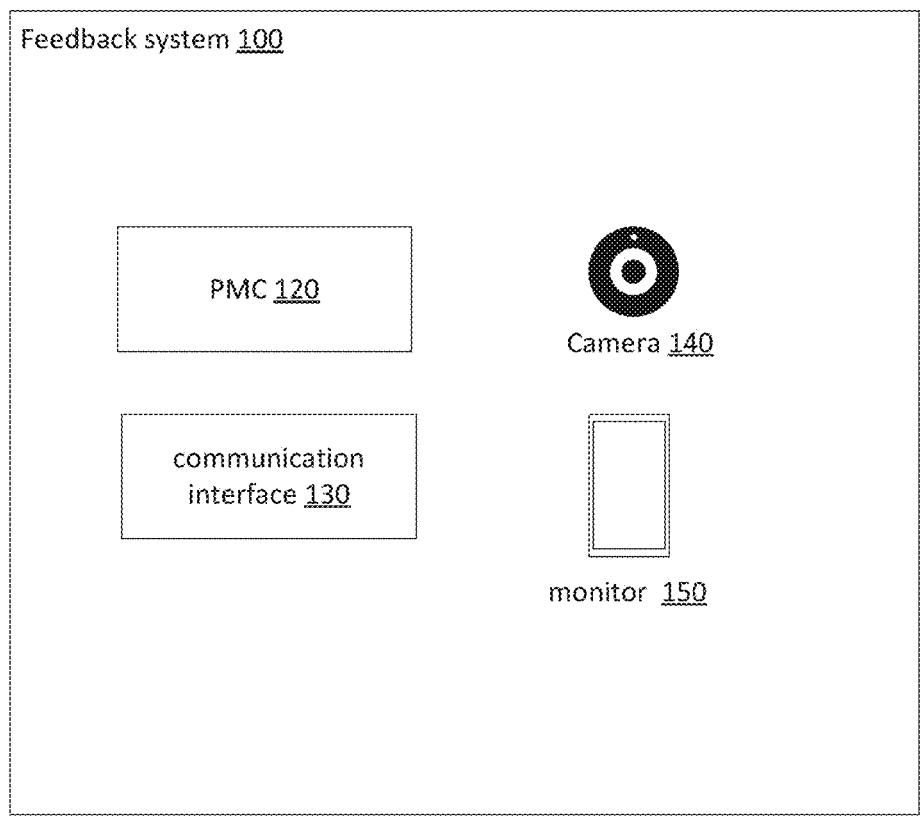
FIG. 1a illustrates an environment comprising a feedback system 100, in accordance with certain embodiments of the presently disclosed subject matter.

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "providing", "obtaining", "determining", "selecting", "obtaining", "scoring", "calculating", "transforming", "fusing", "pre-processing", "associating", "aggregating", "normalizing" or the like, refer to the action(s) and/or process(es) of a computer that manipulate and/or transform data into other data, said data represented as physical, such as electronic, quantities and/or said data representing the physical objects.

The terms "computer", "computer/computerized device, "computer/computerized system", or the like, as disclosed herein, should be broadly construed to include any kind of hardware-based electronic device with a data processing circuitry (e.g. digital signal processor (DSP), a GPU, a TPU, a field programmable gate array (FPGA), an application specific integrated circuit (ASIC), microcontroller, microprocessor etc.), and, by way of non-limiting example, the processor and memory circuitry (PMC) 120 disclosed in the present application. The processing circuitry can comprise for example, one or more computer processors operatively connected to computer memory, loaded with executable instructions for executing operations, as further described below.

The terms "non-transitory memory" and "non-transitory storage medium" used herein should be expansively construed to cover any volatile or non-volatile computer memory suitable to the presently disclosed subject matter.

The operations in accordance with the teachings herein may be performed by a computer specially constructed for the desired purposes, or by a general-purpose computer specially configured for the desired purpose by a computer program stored in a non-transitory computer-readable storage medium.

In known methods of providing a feedback on a move to a trainee user (referred to also as a trainee throughout and below), learning move skills requires the trainee to observe and imitate a move of a teaching user (also referred to hereinbelow as a trainer). The trainee performs a move, and his/her performance is tracked by sensors, e.g. by a video camera, is processed, and then, feedback of the performed move is provided to the trainee. In some known solutions, the system provides feedback to the trainee by reporting a set of measurements relating to the move performed by the trainee. Consider the example of a user performing a kick of a ball move. Known feedback systems include feedback relating to the force or speed of kicking the ball, as measured by sensors on the user or the ball. In an example of a tennis player hitting a ball with a racquet, feedback may relate to the angle of the hand holding the racquet. However, while processing a trainee move with reference to a trainer move can include basic indications on the differences between the moves, it is advantageous to further focus on the differences in aspects of the performance of the move, e.g. the accuracy, the timing, and the style aspects of the performed move when compared to the trainer move. For instance, two different trainee users might do the same move (e.g. ball dribbling or playing the guitar) in an accurate and similar manner when compared to a trainer move, yet with different style. Hence, each trainee should receive different feedback. While both feedbacks may include an indication of the high similarity to the trainer move, each feedback should focus on other aspects of the performed move, such as the style of the move. Hence, it is advantageous to process the trainee movement with respect to various aspects, such as accuracy, timing and style, and to provide feedback based on the aspects of the performance, such that feedback facilitates the trainee to improve the performance of a future move with respect to the trainer move.

Reference is made to FIG. 1a illustrating an environment comprising feedback system 100, in accordance with certain embodiments of the presently disclosed subject matter. Feedback system 100 comprises a processor and memory circuitry (PMC) 120 comprising a processor and a memory (not shown), communication interface 130, a camera 140 and a monitor 150. The feedback system 100 is configured to score performance of a move of a trainee, e.g. as included in a trainee video, in relation to a move of a trainer in a trainer video. In some examples, the trainer video can be obtained by PMC 120, e.g. by retrieving the trainer video from a memory operatively communicating with PMC 120.

The trainer video including the trainer move can be displayed on the monitor 150 to the trainee 110. According to certain embodiments of the presently discloses subject matter, a trainee 110 tries to imitate the trainer move and performs the trainer move. A video of the trainee performing the move can be captured by camera 140. Feedback system 100, e.g. using PMC 120, is configured to obtain the trainee video comprising the trainee move, e.g. by receiving the trainee video from camera 140. PMC 120 is further configured to process the trainee move in the trainee video, based on the trainer move in the trainer video, in order to provide a move performance score. The move performance score is indicative of the performance of the trainee move in relation to the trainer move, where the performance can be evaluated with respect to various aspects of the performance. In some examples, the accuracy of the trainee move can be evaluated, when comparing the similarity of the trainee move to that of the trainer move. In some additional examples, the timing of the trainee move can be evaluated, when comparing timing parameters of the trainee move and the trainer move. Yet, in some additional examples, the style of the trainee move can be evaluated, when considering various motion dynamic features of the trainee move. Various aspects of the performance are further described below with respect to FIGS. 5 and 13.

Once the trainee move is processed and scored, feedback may be provided to the trainee by PMC 120, e.g. by displaying the feedback on the monitor 150. Feedback to the trainee can include a single score rating the performance of the move and/or guiding statements on how to better perform the move. The guiding statements may indicate differences between the performed trainee move and the trainer move, as processed in relation to the aspects of performance. The guiding statements also may include specific corrections that should be made in the performance of the move, such that the feedback facilitates the trainee to improve the performance of a future move with respect to the trainer move. For example, the feedback may include a guiding statement of raising the hand all the way up, or being faster.

Figure 1B:
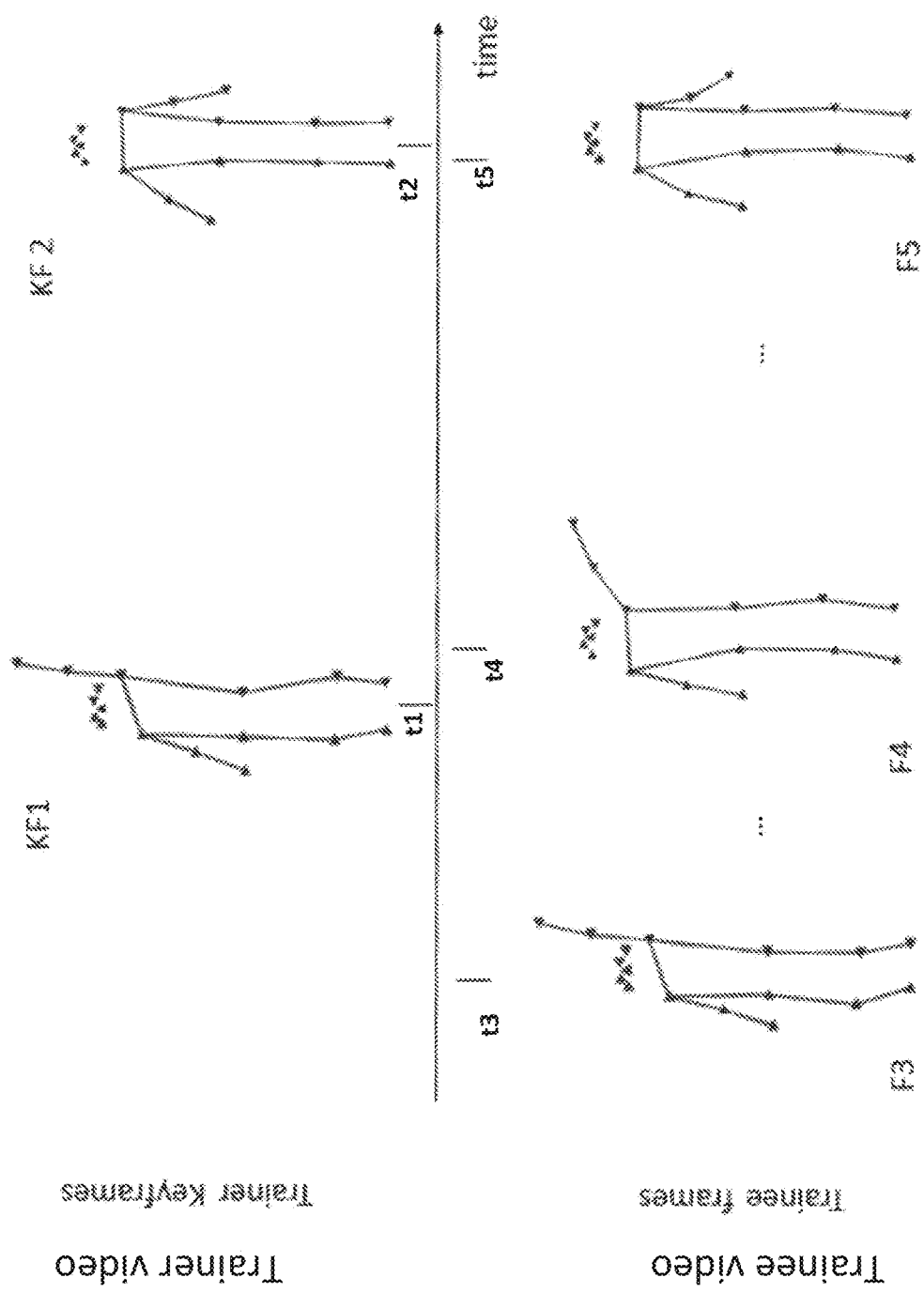
FIG. 1b illustrates exemplary videos including keyframes, in accordance with certain embodiments of the presently disclosed subject matter.

Reference is now made to FIG. 1b illustrating an exemplary trainer video and a trainee video, in accordance with certain embodiments of the presently disclosed subject matter. It should be noted that for purpose of illustration only, the following description is provided for processing a video of a trainee or a trainer, e.g. a trainee video as captured by a camera. Those skilled in the art will readily appreciate that the teachings of the presently disclosed subject matter are, likewise, applicable to any other medium that is configured to provide data on a move of a user. The move of the user may include a detected sequence of poses of a user. Each pose may be defined by a set of joints. A frame input may include one pose defined by the set of joints. The frame input can be derived from a video, a sequence of images, recording of marker-based pose sequences (mocap/motion capture), digital animation data, complex motion sensing device (e.g. Kinect), etc. which can be obtained from various sensors including motion capture, depth camera (time-of-flight imaging), IMU-based pose-tracking systems and others.

In some examples, each e of the trainer and trainee videos includes a move. For example, the trainer video may include a trainer move of putting the hand down. In some cases, in order to provide a move performance score for a trainee move, it may be advantageous to divide the trainer move, and the trainee move, into frame and keyframes. A frame, as known in the art, may include a shot in a video, with 2D or 3D representation of the skeleton of a person appearing in the shot, or other vector-based representation of a person, at a particular point in time of the video. A move of the person can be represented by a sequence of frames. In examples where a sequence of trainee images are received (instead of a trainee video), each image can be referred to as a frame. A keyframe should be expansively construed to cover any kind of a subset of a sequence of frames, typically defining inga starting or ending point of a transition in a move. In some examples, keyframes can distinguish one frame sequence from another, and can be used to summarize the frame sequence, such that it is indicative of the move of the person in the sequence of frames.

Referring back to FIG. 1b, for example, the trainer move of putting the hand down may be represented by a sequence of frames (not shown) and may include two keyframes taken from the sequence of frames. The first keyframe KF1 is when the hand is up, and the second keyframe KF2 is when the hand is down. Determining keyframes from a sequence of frames can be done e.g. manually, or by executing known per se techniques on the trainee video. Times t1 and t2 indicate the time in the video during which KF 1 and KF 2 appeared. The trainee move is represented by a sequence of three frames. F3, F 4 and F5F5. Times t33-t5 indicate the time in the video during which F3-F5 appeared. As explained further below, processing frames in a trainee move to keyframes in a trainer move may assist in evaluating the performance of the trainee move in a more accurate manner. Once a trainer move is divided into keyframes, for each trainer keyframe included in the trainer move, it is advantageous to select a matching frame from the trainee move. One approach of selecting a matching trainee frame to a trainer keyframe includes selecting trainee frames that appear at the same time, or substantially the same time, as in the trainer video. For example, trainee frame F4 appears in time t4, which is substantially the same as KF 1 in t1, and hence may be selected as a matching frame to trainer KF1. For a similar reason, F5 in time t5 may be selected as a matching frame to trainer KF2 in t2. However, selecting the matching frame in a straightforward manner may yield to selecting matching keyframes which are not optimal, e.g. from a visual comparison perspective, resulting in less accurate evaluation of the trainee move. The resulting feedback that the trainee will receive, which is based on his score, will also not assist the trainee in performing a future move in a better manner. Instead, a more accurate selection of a matching keyframe should be made. This is based on the assumption that the trainee tries to imitate and learn the move of the trainer, and hence, its initial performance of the move is not perfect, as otherwise no training would have been required. During training, the trainee may perform a move in an accurate manner, yet not at the same time as the trainer. For example, a trainee may perform the move of the trainer, but with a delay in time, in a slower rhythm than that which is performed by the trainer, or in an opposite sequence of moves than that performed by the trainer. In such cases, if an optimal selection of a matching keyframe is done, the trainee move will be evaluated and feedback will be provided with a high similarity score and a poor timing score. The trainee receiving the feedback would focus on improving the timing of the move, rather than unnecessary focus on performing the move in a more accurate manner. In FIG. 1b, selection of F3 as a matching keyframe to KF1 is better and yields better feedback, while focusing on the poor timing, instead of the lack of similarity, of a move.

Figure 2:
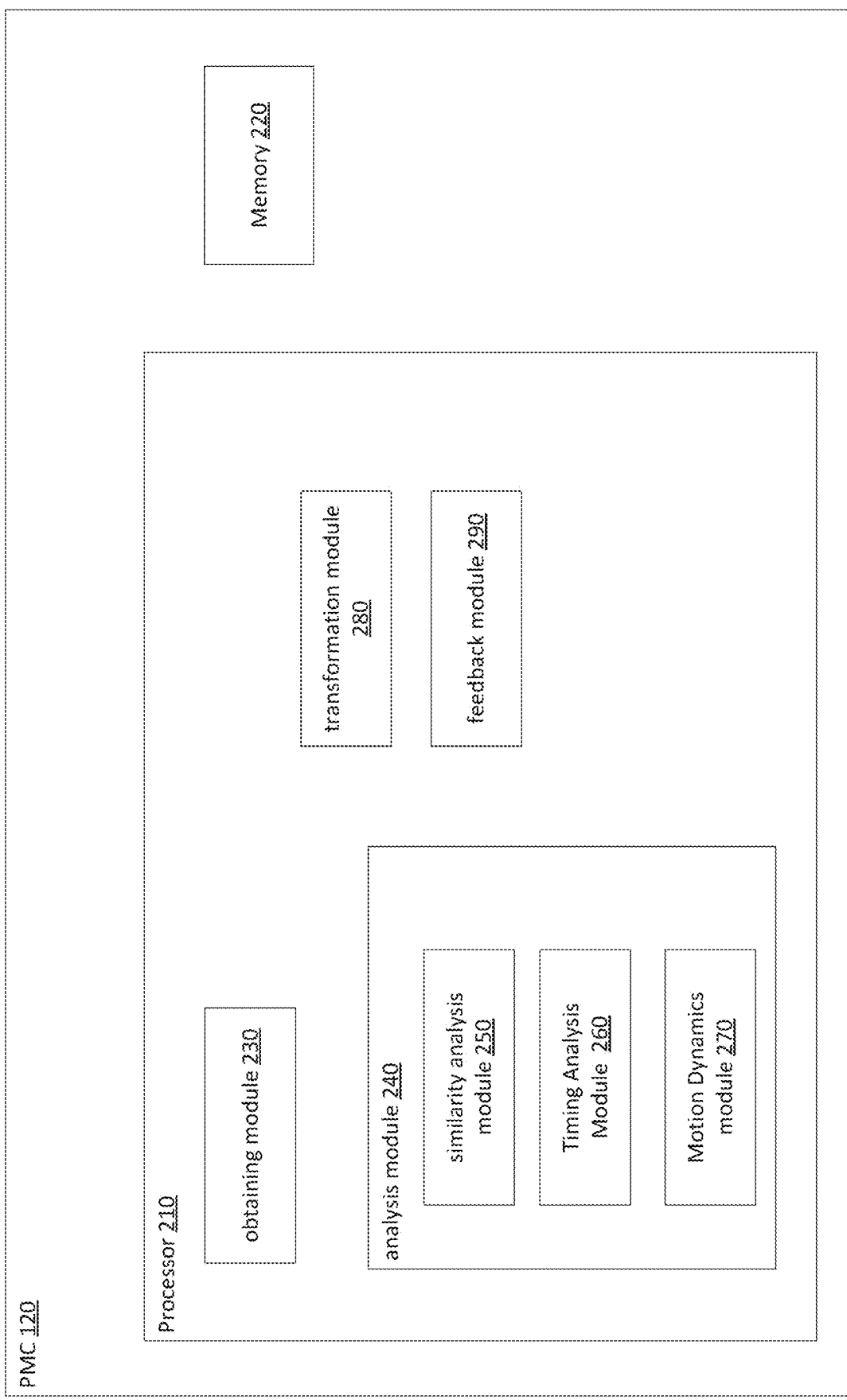
FIG. 2 illustrates a high-level functional block diagram of PMC 120, in accordance with certain embodiments of the presently disclosed subject matter.

Referring to FIG. 2, there is illustrated a high-level functional block diagram of PMC 120 included in feedback system 100 of FIG. 1, in accordance with certain embodiments of the presently disclosed subject matter. PMC 120 comprises a processor 210 and a memory 220. The processor 210 is configured to execute several functional modules in accordance with computer-readable instructions implemented on a non-transitory computer-readable storage medium. Such functional modules are referred to hereinafter as comprised in the processor 210. The processor 210 can comprise obtaining module 230, analysis module 240 comprising similarity module 250, timing module 260, motion dynamics module 270, transformation module 280 and feedback module 290.

In some cases, a trainer video may be obtained by obtaining module 230, e.g. by retrieving the trainer video from memory 220. The trainer video may be displayed on monitor 150 appearing in FIG. 1. A trainee 110 tries to imitate the trainer move and performs a move, which is captured as a video in camera 140. In some cases, obtaining module 320 is further configured to obtain trainee video comprising a trainee move, e.g. by receiving it from camera 140. Once the trainee video is obtained, PMC 120, e.g. using analysis module 240, is configured to process the trainee move in the trainee video, based on the trainer move included in the trainer video, in order to provide a move performance score. Analysis module 240 comprises similarity module 250, timing module 260, and motion dynamics module 270. Each of the modules 250, 260 and 270 are configured to analyse the trainee move with respect to at least one aspect of the performance, and to provide an aspect score. For example, similarity module 250 is configured to analyse the similarity of the trainee move to that of the trainer move, and to provide a similarity score. Timing module 260 is configured to analyse the timing of the trainee move, and to provide a timing score. Motion dynamics module 270 is configured to analyse the style of the trainee move, when considering various motion dynamic features of the trainee move and to provide a motion dynamics score. Analysing the aspects of performance, as performed by modules 260, 270 and 280, is further described below with respect to FIGS. 5-13.

The calculated aspect scores can be transformed, e.g. by the transformation module 280, giving rise to a move performance score. For example, a similarity score can be calculated for each trainee frame. Transformation module 280 is configured to aggregate the similarity scores of all trainee frames into a single move performance score. In some examples, if more than one aspect scores are calculated, then the scores of each aspect for each frame can be fused, e.g. using a conditional aggregation, giving rise to the move performance score. Fusing several aspects scores is further described below with respect to FIG. 3. Based on the move performance score, feedback module 290 is configured to provide feedback to the trainee, whereby the feedback facilitates the trainee to improve the performance of a future move with respect to the trainer move.

It is noted that the teachings of the presently disclosed subject matter are not bound by the feedback system described with reference to FIGS. 1 and 2. Equivalent and/or modified functionality can be consolidated or divided in another manner, and can be implemented in any appropriate combination of software with firmware and/or hardware, and executed on a suitable device. The feedback system can be a standalone network entity, or integrated, fully or partly, with other network entities. Components of the feedback system, such as PMC 120, camera 140 monitor 150, can be integrated as components of a mobile device comprising the feedback system, or can be separated, and operatively communicate with PMC 120 e.g. through communication interface 130. Those skilled in the art will also readily appreciate that the data repositories such as memory 220 can be consolidated or divided in other manner; databases can be shared with other systems, or be provided by other systems, including third party equipment.

As described above, it is advantageous to select a matching trainee frame to each trainer keyframe. However, in some cases, e.g. when the trainee skips portions of the move, a matching trainee frame may not exist, and no trainee frame is selected for one or more trainer keyframes. In order to select a matching frame for a trainer keyframe, one or more trainee frames may be selected as candidate frames (referred to also hereinbelow as candidates). From among the candidates, one frame may be selected as the matching frame. In order to select the matching frame from the candidates, the selected candidate frames are processed and evaluated, based on aspects of the performance of the move, resulting in the move performance score. Based on the move performance score, feedback can be provided to the trainee.

Figure 3:
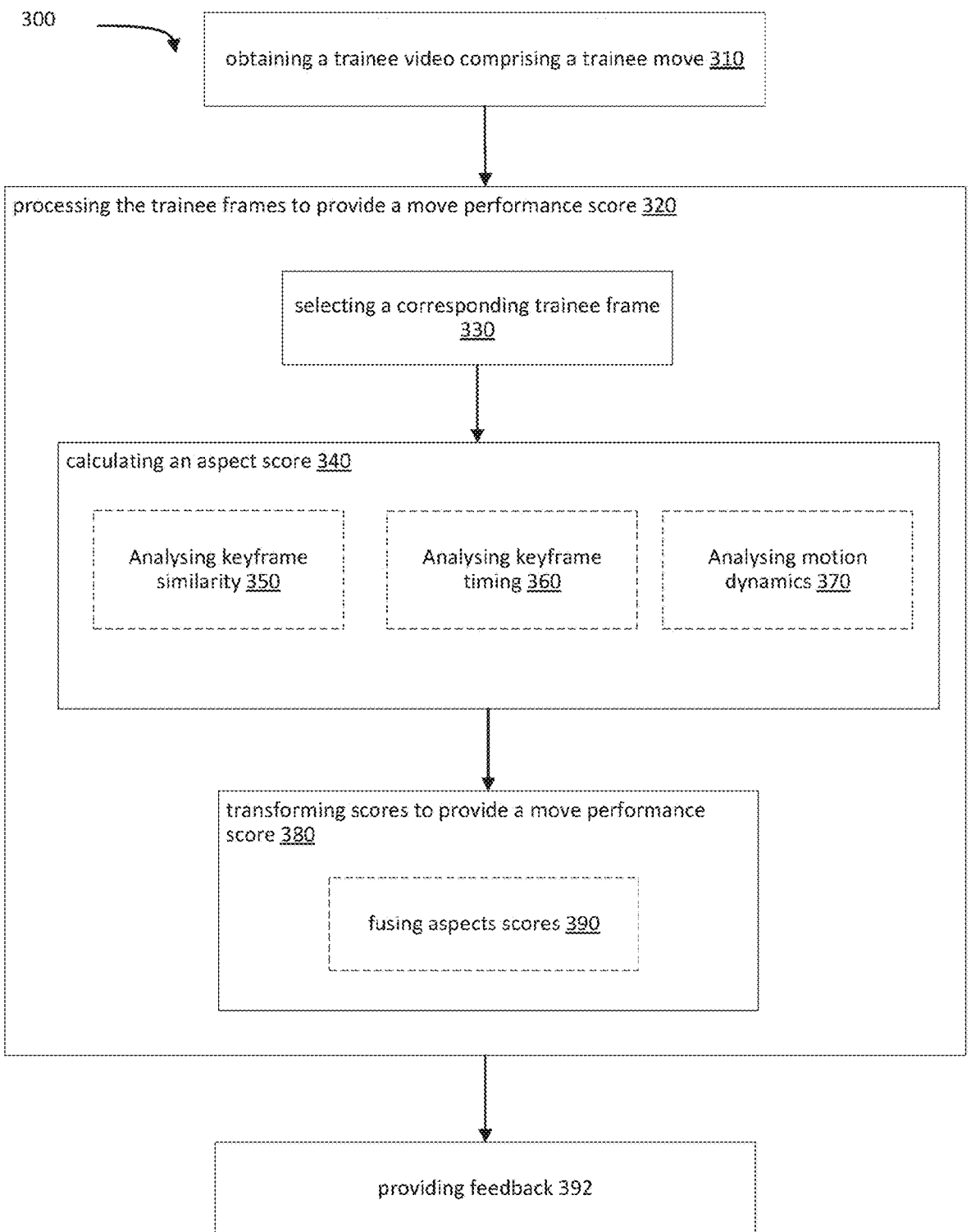
FIG. 3 illustrates a generalized flow chart of operations performed by PMC 120, in accordance with certain embodiments of the presently disclosed subject matter.

Referring to FIG. 3, there is illustrated a generalized flow chart of operations performed by PMC 120, in accordance with certain embodiments of the presently disclosed subject matter. The operations are described with reference to elements of feedback system 100 and PMC 120. However, this is by no means binding, and the operations can be performed by elements other than those described herein.

The performance of move of a trainee in an input frame, e.g. a trainee video or a sequence of images, can be processed and scored in relation to a trainer move in a trainer video. As explained above, in order to process the trainee move in a more accurate manner, it may be advantageous to process frames included in the move. In some cases, obtaining module 230 can obtain the trainer video, e.g. by retrieving a stored trainer video from memory 220. The obtained trainer video may include at least one trainer keyframe. In some examples, the trainer video includes two or more trainer keyframes. Obtaining module 230 can further obtain a trainee video comprising a trainee user move (block 310). The trainee user move can comprise a plurality of trainee frames. As mentioned above, the description is provided for processing a video of a trainee, e.g. as captured by a camera. Those skilled in the art will readily appreciate that the teachings of the presently disclosed subject matter are, likewise, applicable to any other medium that is configured to provide a frame input, including a move of a user, such as a sequence of trainee images.

Next, analysis module 240 can process the plurality of trainee frames to provide a move performance score (block 320). The move performance score can be indicative of the performance of the trainee move in relation to the trainer move, with respect to at least one aspect of the performance. For example, the aspects of performance can include similarity analysis, timing analysis, and motion dynamics analysis. These aspects are further described below.

Analysis module 240 can select, for a trainer keyframe, a corresponding trainee frame of the plurality trainee frames. The selected trainee frame constitutes a candidate trainee frame. In some examples, analysis module 240 can select, for a trainer keyframe, more than one corresponding trainee frames constituting candidate trainee frames. In some examples, for each trainee frame, one or more corresponding trainee frames are selected and constitute candidates. A matching trainee frame to the trainer keyframe can be selected from the candidate trainee frames.

Selection can be based on a selection criterion. For example, the selection criterion can be a time criterion. Selecting according to time criterion can include selecting one or more trainee frames that appear in a time window in the trainee video, that are around a time point of the trainer keyframe in the trainer video. The term "time window around a time point" should not be considered as limiting and should be interpreted in a broad manner. In some examples, the trainee time window includes a time interval comprising a predefined time before and/or after the time point that the trainer keyframe appears in the video.

Figure 4:
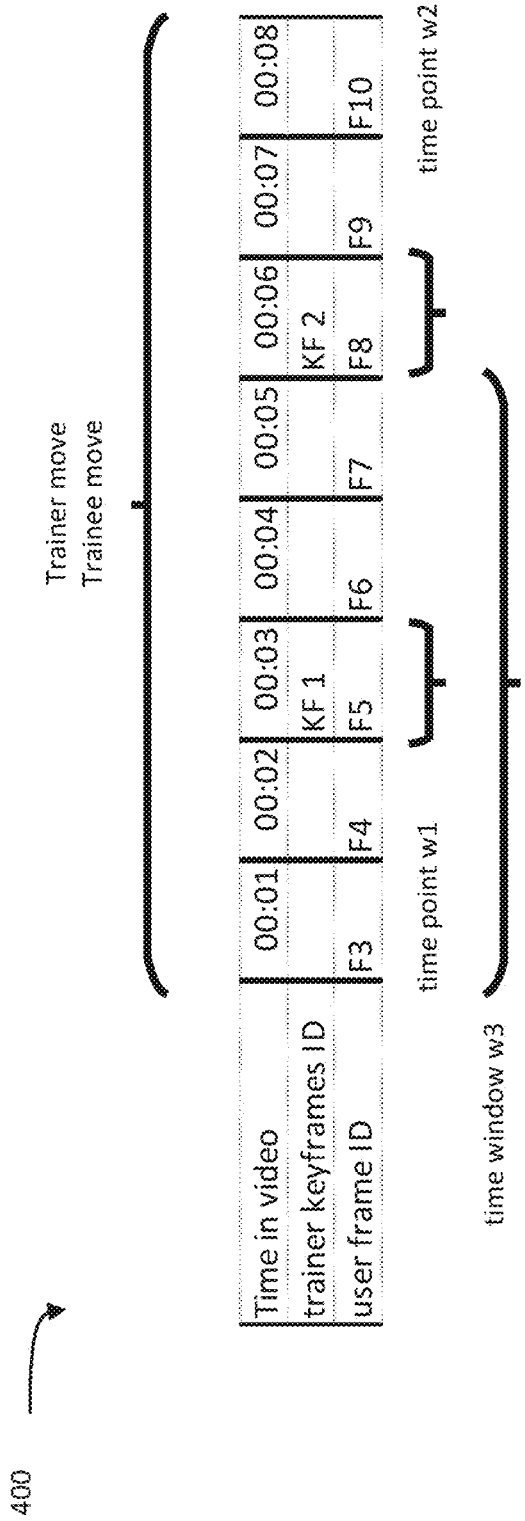
FIG. 4 illustrates exemplary timelines of the trainer keyframes and the trainee frames in the respective videos, in accordance with certain embodiments of the presently disclosed subject matter.

Reference is now made to FIG. 4 illustrating exemplary timelines of trainer keyframes and trainee frames in respective trainer and trainee videos. As illustrated in FIG. 4, trainer move includes two keyframes KF1 and KF 2, however, this should not be considered as limiting and the trainer move can include one trainer keyframe only. In FIG. 4, KF1 appears in time point 00:03 denoted by timepoint w1, and KF2 appears in time point 00:06 denoted by time point w2. The trainee move includes eight frames, F3-F10 appearing in respective time points 00:01 to 00:08.

For each trainer keyframe KF1 and KF2, one or more trainee frames F3-F10 may be selected as candidates. For example, for trainer KF1 appearing in time point w1aa predefined +2/-2 time interval may be determined, and trainee frames F3-F7 appearing in a time window w3 that is around time window w1 can be selected as candidates. Yet, in some examples, the predefined time may be 0. In such examples, the trainee time window is identical to the trainer time point, resulting in selecting one candidate trainee frame for each trainer keyframe. The candidate appearing at the same time point in the trainee video as the trainer keyframe appears in the trainer video. For example, F5 may be selected for KF1 and F8F8 may be selected for KF2. It should be noted that in some examples, the trainee time window can include the entire trainee video, and the candidates for a trainer keyframe can be selected from the entire trainee video. However, selecting candidates from a time window that is shorter than the entire trainee video may optimize the process and require less computational time for processing.

Referring back to FIG. 3, in some cases, an aspect score can be calculated based on a trainer keyframe and the respective candidate trainee frames (block 340). In case the trainer move comprises more than one trainer keyframes, an aspect score can be calculated for more than one trainer keyframe and the respective candidates. With respect to the example in FIG. 4, a first aspect score can be calculated for KF1 and candidates F3-F6, while a second aspect score can be calculated for KF2 and candidate F8. If the move performance score is provided with respect to more than one aspect of the performance, then an aspect score can be calculated for each trainer keyframe and the respective candidates. For example, based on KF1, a similarity score and a timing score can be calculated for each of candidates F3-F6.

Once one or more aspect scores are calculated, the scores may be transformed to provide a move performance score, (block 380) and a feedback may be provided to the trainee (block 392). These last stages are further described below.

Following is a description of three exemplary aspects of the performance and calculating aspect scores for each of them as described in block 340 in FIG. 3. The aspects are a similarity aspect, a timing aspect, and a motion dynamics aspect. It should be noted that each aspect is independent of the other one. Yet, one aspect score can be calculated and be provided as an input, and be used in the calculation of a score of another aspect. For example, scores can be calculated for similarity and motion dynamic aspects, and can be provided as an input when calculating a timing aspect score.

The similarity aspect may measure to which extent the trainee move is similar and accurate, with respect to the trainer move. In some examples, in order to evaluate similarity of moves, body parts in a trainer keyframe can be compared to body parts in the candidate trainee frame. Body parts in a pose can be defined by joint pairs, e.g. by their start and end joints, where a joint may be regarded, as known in computer vision terminology, as a structure in the human body, typically, but not exclusively, at which two parts of the skeleton are fitted together.

Figure 5:
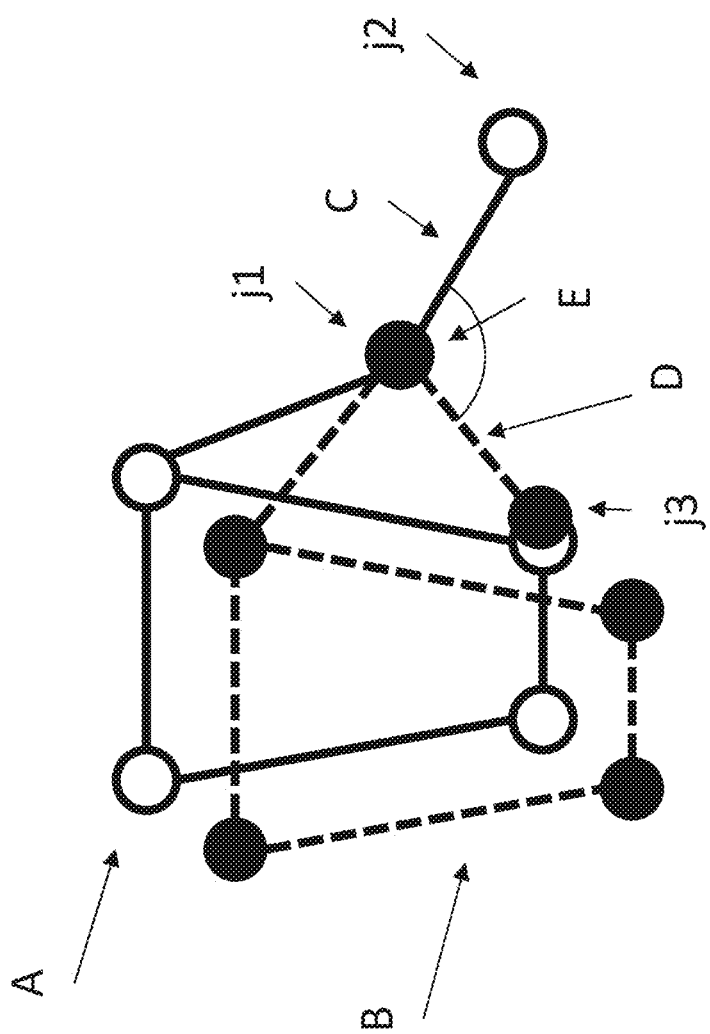
FIG. 5 illustrates two keyframes in accordance with certain embodiments of the presently disclosed subject matter.

In order to calculate the similarity aspect score, the angular differences between body parts in a pose of the trainer in the trainer keyframe, and body parts in a pose of the trainee in the candidate trainee frames, can be computed. Reference is now made to FIG. 5 illustrating an example of computing one angular difference between body parts in a keyframe and a frame. A more general description of the process follows the description of FIG. 5. Illustrated in FIG. 5 are poses A and B shown from a trainer keyframe and a trainee frame, where only the torso and the left arms of each pose A and B are illustrated. Pose B is illustrated in a dashed line. In this example, a body part, such as the lower arm, is defined by a vector representing a joint pair. Lower arm C of body pose A is defined by a vector from the elbow joint j1 to the wrist joint j2 and lower arm D of body pose B is defined by a vector from the elbow joint j1, (identical to j2 of body pose A) to the wrist joint j3. The similarity of the two vectors of lower arms C and D can be compared, e.g. by using an angle E of the two vectors and the cosine distance. Other body parts in the pose can be represented by other vectors, and a similarity calculation can be performed for the other vectors. Based on calculated similarity of several body parts of the pose, a similarity score can be determined, e.g. by aggregating the similarity of the separate body parts.

Figure 6:
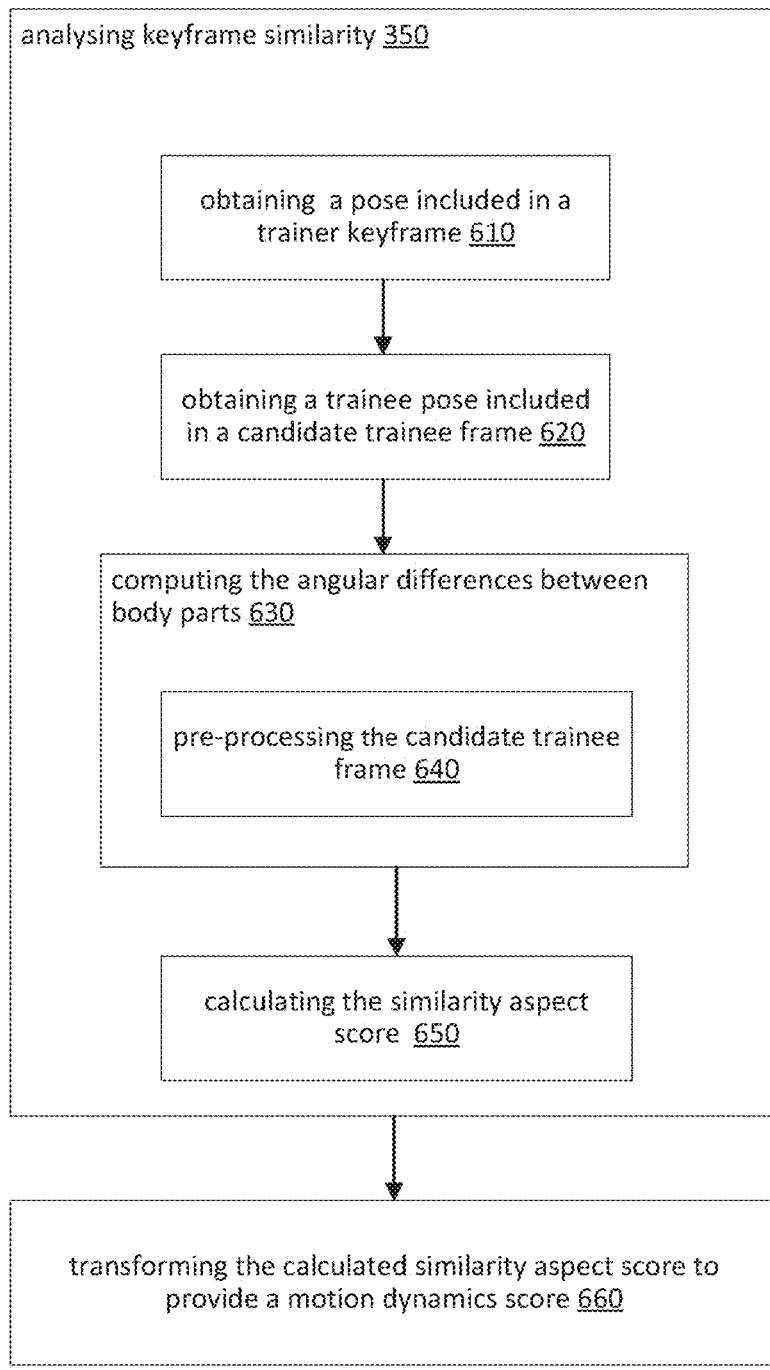
FIG. 6 illustrates a generalized flow chart of analysing keyframe similarity, in accordance with certain embodiments of the presently disclosed subject matter.

Referring now to FIG. 6, there is illustrated a generalized flow chart of analysing keyframe similarity 350 comprised in calculating an aspect score 340 block in FIG. 3, in accordance with certain embodiments of the presently disclosed subject matter. The stages can be performed e.g. by similarity analysis module 250 appearing in FIG. 2.

A trainer keyframe can include a pose. A trainer pose can be obtained (610), e.g. by defining a set of several body parts appearing in the trainer keyframe. Each body part may be represented by a vector from the start joint to the end joint. A trainee pose from a candidate trainee frame can be obtained, e.g. using known, per se techniques, (block 620), for example, by defining a set of several body parts appearing in the candidate trainee frame. Each body part may be represented by a vector from the start joint to the end joint and may correspond to a respective body part in the trainer pose, starting from the same start joint to the end joint. This enables comparison between the vectors. In FIG. 5, the comparison is illustrated by plotting the two poses on top of each other (yet, the plotting is not a necessary operation) to visualize how the lower arm of the trainee is compared the lower arm of the trainer.

For at least one body part included in the trainer keyframe, and at least one corresponding body part included in the candidate trainee frames, analysis module 250 can compute the angular difference between the body parts (block 630). For example, analysis module 250 can compute the angular difference between the vectors of the body parts, e.g. as illustrated in FIG. 5, using angle E between body part C and D. In some examples, the difference between two vectors can be calculated based on appropriate distance metrics, by computing at least one parameter from a group of parameters comprising: absolute angular difference, cosine distance, and a learned distance. With respect to learned distance, in some examples, the distance metric between two vectors can also be learnt from data. For example, mapping from differences of two vectors to a distance is learned based on examples with known (or annotated) distance. Learning methods can include regression, neural networks, or statistical approaches.

In some examples, using angular differences, such as angle E illustrated in FIG. 5, may be advantageous, since the body skeletons in poses in the keyframes or frames are not required to be normalized to unit height. Yet, in some examples, the trainer keyframe is associated with a predefined keyframe format, e.g. normalized to unit height, or includes dimensional information which assists in formulating the vector of the body parts. In such examples, before computing the angular differences, analysis module 250 can pre-process the candidate trainee frames in accordance with the predefined keyframe format of the trainer keyframe, giving rise to a formatted candidate frame that is formatted according to the predefined format (block 640). The angular differences can then be computed between the body parts in the trainer keyframe and body parts in the formatted candidate frames. For example, the trainer body parts in poses in the trainer keyframe can be normalized into unit height. Hence, before conducting the similarity calculation, the trainee frame can be pre-processed by normalizing the trainee body parts to unit height. Normalization can be based on either a set of standard human relative body part lengths, or on a calibration phase to the trainee relative body part lengths.

Another example of pre-processing relates to the dimension of the vector representing body parts. Based on information captured by a non-depth camera, a 2-dimensional vector of body parts can be formulated. In some examples, a depth plane extension can be predicted from the 2-dimensional information, to formulate a 3 dimensions vector representing the body parts. For example, this can be done using the principle of projection: the projection of a line segment with a known length appears shorter when the start and end point are not located on the same depth. Representing a body part as a 3 dimensions vector may be advantageous as computing the angular differences between the body parts is more accurate since it accounts for rotation in the depth plane as well.

Based on the computed angular differences, analysis module 250 can calculate a similarity aspect score for a frame (block 650, which corresponds to blocks 340 and 350 in FIG. 3), e.g. by aggregating the angular differences of the separate body parts.

In some examples, the aggregation can be weighted and indicate a predefined importance of the body parts in the pose, such that the computed angular differences between less important body parts will contribute less to the calculation of the similarity aspect score. In order to indicate a predefined importance of body parts in a pose, a body part of the trainer can be associated with a respective weight. The weight can be indicative of the importance of the body part in the pose. In the example of putting the hand down, low weights may be associated with legs body parts, average weights may be given to the hand which is not moving, and high weights may be associated with body parts of the hand which should be put down. One or more body parts may be associated with a zero weight, such that they do not contribute to the similarity aspect score. The associated weights can be stored, e.g. in memory 220, and can be retrieved by analysis module 250. In cases where a body part is associated with a respective weight, analysis module 250 can compute the angular difference between body parts, and associate the computed angular difference with the respective weight of the body part. The similarity aspect score can be calculated according to the associated respective weight. For example, the aggregation of the separate angular differences can be according to the associated respective weight of each body part.

Alternatively or additionally, in some cases, predefined variations of the pose of the trainer are allowed, such that despite a high difference between body parts of the trainer and the body parts of the trainee was computed, the high angular difference should contribute less to the similarity aspect score, resulting in a higher similarity score.

Alternatively or additionally, aggregation of the similarity of the separate body parts can be calculated using summary statistics, such as minimum, average, and percentile. Yet, in some examples, the aggregation can be also learnt using known per se machine learning methods by mapping the distances of one or more body parts to an overall similarity score. For example, machine learning methods can include regression, neural networks, or statistical approaches.

The calculated similarity scores can be stored by analysis module 250, e.g. in memory 220.

In some cases, the calculated similarity score of the candidate frames can be transformed, giving rise to the move performance score (block 660 which corresponds block 380 in FIG. 3).

Reference is now made to FIG. 7 illustrating exemplary timelines 700 of the trainer keyframes and the trainee frames, similar to those illustrated in FIG. 4, in accordance with certain embodiments of the presently disclosed subject matter. It should be noted that the time window w1 of candidates F3-F7 is identical to that illustrated in FIG. 4, while the time window w2 for KF2 is now defined to include F6 to F10 as candidates to KF2. Also illustrated in FIG. 7 are the results of the similarity analysis including a similarity score for each candidate. For example, F3 has a 0.4 similarity score with respect to KF1 and F7 has a 0.7 similarity score with respect to KF1. F6 has a 0.8 similarity score with respect to KF2 of the trainer. F6 and F7 are candidates of both KF 1 and KF2, and can yield different similarity scores for different trainer keyframes. Also to be noted is that, based on the similarity scores, F7 has the highest similarity score to KF1, and F6 has the highest similarity score to KF2. Based on the similarity analysis, F7 and F6 can be selected as matching frames to KF1 and KF2 from the candidates of each keyframe, respectively.

In some cases, the calculated aspect scores of the candidate frames can be transformed, giving rise to the move performance score. The transformation function is further described below with respect to block 360 of FIG. 3.

In some examples, one or more additional similarity analysis can be performed. The additional similarity analysis can be performed, in order to identify one or more additional insights on the performance of the move, and provide suitable feedback. The additional similarity analysis can be performed based on the same trainee input frames with respect to a second, different, set of trainer keyframes. The second set of keyframes can be predefined based on the keyframes of the trainer, and may reflect typical mistakes or possible variations to the trainer keyframes, for example, wrong limb, mirrored move, swapping of two moves. The second set of keyframes may be stored in memory 220 and obtained by similarity analysis module 250. Additional similarity scores, calculated based on the additional similarity analysis, can be indicative of the performance of the move by the trainee. In case the additional set of keyframes reflects typical mistakes (e.g. an alternative trainer keyframe shows a body pose including hand up instead of the hand down in the trainer keyframe), then, as opposed to the regular similarity analysis, high similarity scores in the additional similarity analysis are indicative of low performance of the move. In case the additional keyframe similarity reflects possible variations, then high similarity scores in the modified similarity analysis are indicative of high performance of a variant of the move. In addition, usage of calculated modified similarity scores to provide a move performance score is further described below with respect to timing analysis.

Attention is now reverted to a description of the timing aspect and calculating a timing score in accordance with certain embodiments of the presently disclosed subject matter. The timing aspect may analyse the timing of the trainee move with respect to the trainer move, while assuming that the trainer timing is accurate, and that the trainee should follow the trainer's timing. The timing analysis may assist in indicating whether the trainee performs the move at the same speed as the trainer. In some examples, based on the timing score that is calculated for the timing aspect, it will be possible to provide the trainee with feedback that his move is too fast, or too slow. In some cases, in order to analyse the timing aspect, it is required to process a segment from the trainer video that includes several trainer keyframes, and to process a corresponding segment from the trainee video that includes corresponding candidate trainee frames. The trainer keyframe and trainee frames in the segments are examined with respect to a plurality of timing parameters. A timing score can be calculated, based on timing parameters.

It should be noted that the timing analysis is independent of the similarity analysis described above, and is related to calculating the timing score with respect to timing parameters. However, processing the timing parameters on frames assumes that some or all of the trainee frames have a matching score indicative of a likelihood of match between the candidate trainee frame to a trainer keyframe. In some examples, the matching score can be calculated based on the similarity analysis, however, this should not be considered as limiting, and those skilled in the art will readily appreciate that the teachings of the presently disclosed subject matter are, likewise, applicable to other matching scores, calculated by other known, per se, techniques.

It should also be noted that while the similarity analysis (or any other matching analysis technique) aims to match a candidate trainee frame to a trainer keyframe in a local manner when considering a trainer keyframe in an individual manner, the timing analysis aims to match trainee frames to trainer keyframes in a more holistic manner, while reviewing the optimal match of trainee frames to keyframes, when considering some or all of the frames in the trainee video. As described further below, in some cases, although the similarity or matching score for a particular trainee frame is high, when timing analysis is performed, the trainee frame may not be selected as a matching frame. The reason is that when processing the entire trainee video and several trainer keyframes, the timing parameters dictate that another trainee frame should be selected as a matching frame. Referring back to FIG. 1b, processing the trainee frames in relation to timing may be advantageous in such examples. For trainer KF1, candidate F3 and F4 are processed. Based on the similarity score, F3 would probably be selected, despite being farther from the expected time point of KF1 than F4. Yet, in some examples, processing the timing aspect of F3 and F4, while considering timing parameters with respect to all trainer keyframes in the video, the selection of a matching frame may result in selection of F4.

Figure 8:
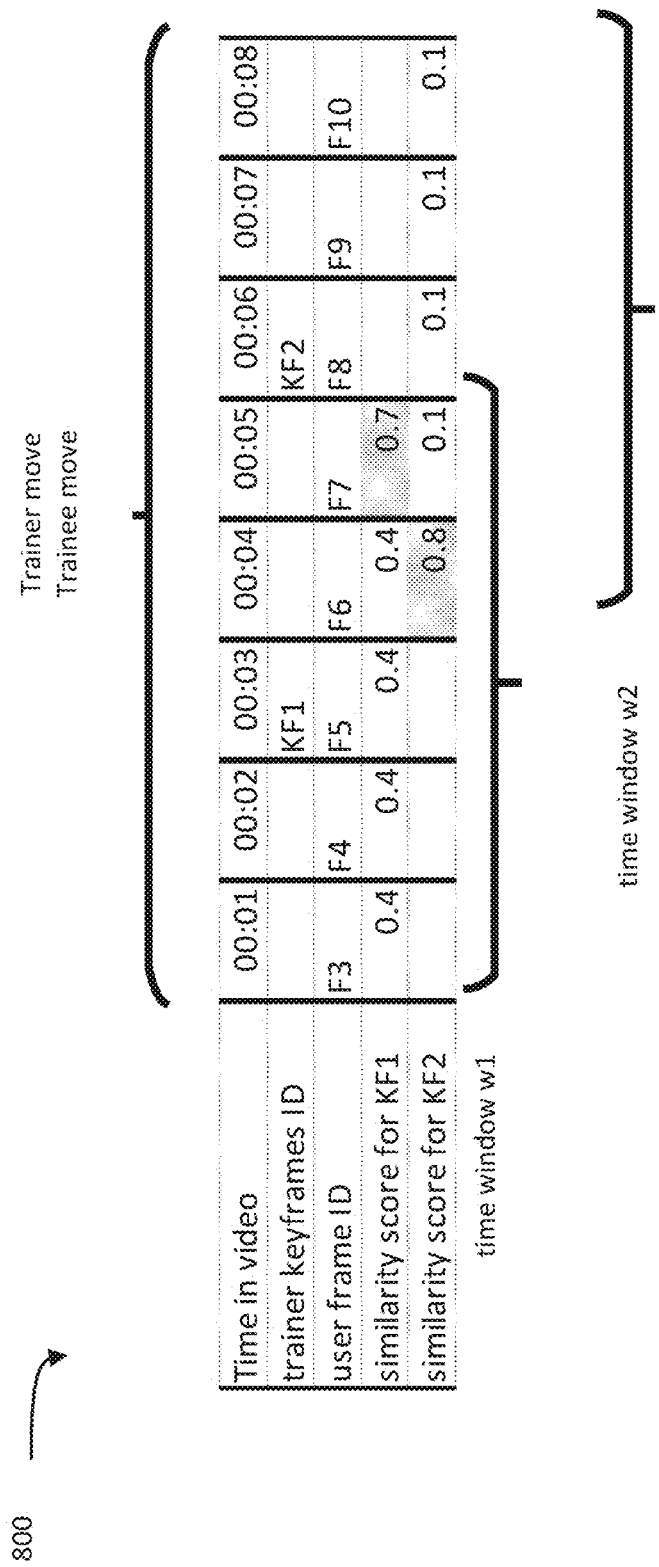
FIG. 8 illustrates exemplary timelines of the trainer keyframes and the trainee frames illustrating an out-of-sync timing parameter, in accordance with certain embodiments of the presently disclosed subject matter.

To generally illustrate the timing aspect analysis, an example of an analysis of one timing parameter, the out-of-sync timing parameter, is provided. The general description of the timing analysis, and further examples of timing parameters, are is described with respect to FIG. 9 which follows this example. According to the out-of-sync parameter, the order of appearance of the trainee frames in the sequence of keyframes should be the same order of appearance of the trainer keyframes in the sequence. Reference is now made to FIG. 8 illustrating an exemplary scenario of applying the out-of-sync timing parameter, in accordance with certain embodiments of the presently disclosed subject matter. FIG. 8 illustrates a table 800 of timelines of the trainer keyframes and the trainee frames, similar to those illustrated in FIG. 7. As illustrated also in FIG. 7, candidate trainee frames are associated with respective matching scores. In this example, the matching score were similarity scores, as described above, however, this should not be considered as limiting, and the matching scores in FIG. 8 could have been obtained using known per se techniques of scoring likelihood of similarity to trainer keyframes.

F7 is marked in grey as it has the highest matching score to KF1 of the trainer, from all candidates of KF1. F6 is marked in grey as it has the highest matching score to KF2 of the trainer, from all candidates of KF2. Selecting a matching candidate based on the matching scores only would have result in selection of F7 as matching to KF1, and selection of F6 as a matching KF2. However, if F7 and F6 are selected for matching KF1 and KF2 respectively, the result would be that F6, appearing before F7 in the trainee video, matches a trainer keyframe KF2, that is later than the trainer keyframe that F7 matches, KF1. When considering the example of the move that includes putting the hand down, where KF1 represents when the hand is up, and KF2 represents when the hand is down, in practice, selection of F7 and F6 would mean that the trainee first put down his hand (KF2 of the trainer), and then raised his hand up (KF1 of the trainer), in an opposite manner to the trainer. The holistic approach of processing KF1 and KF2 together, while considering timing parameters, and applying an out-of-sync timing parameter, may result in selection of either one of F3, F4 or F5 as matching to KF1, such that F6 can be selected to match KF2. Applying a timing analysis may therefore be advantageous when aiming to match a trainee frame to a trainer keyframe more accurately, in a holistic and optimal approach, while processing the entire sequence of the trainer keyframes and trainee frames, in order to provide the move performance score.

Figure 9:
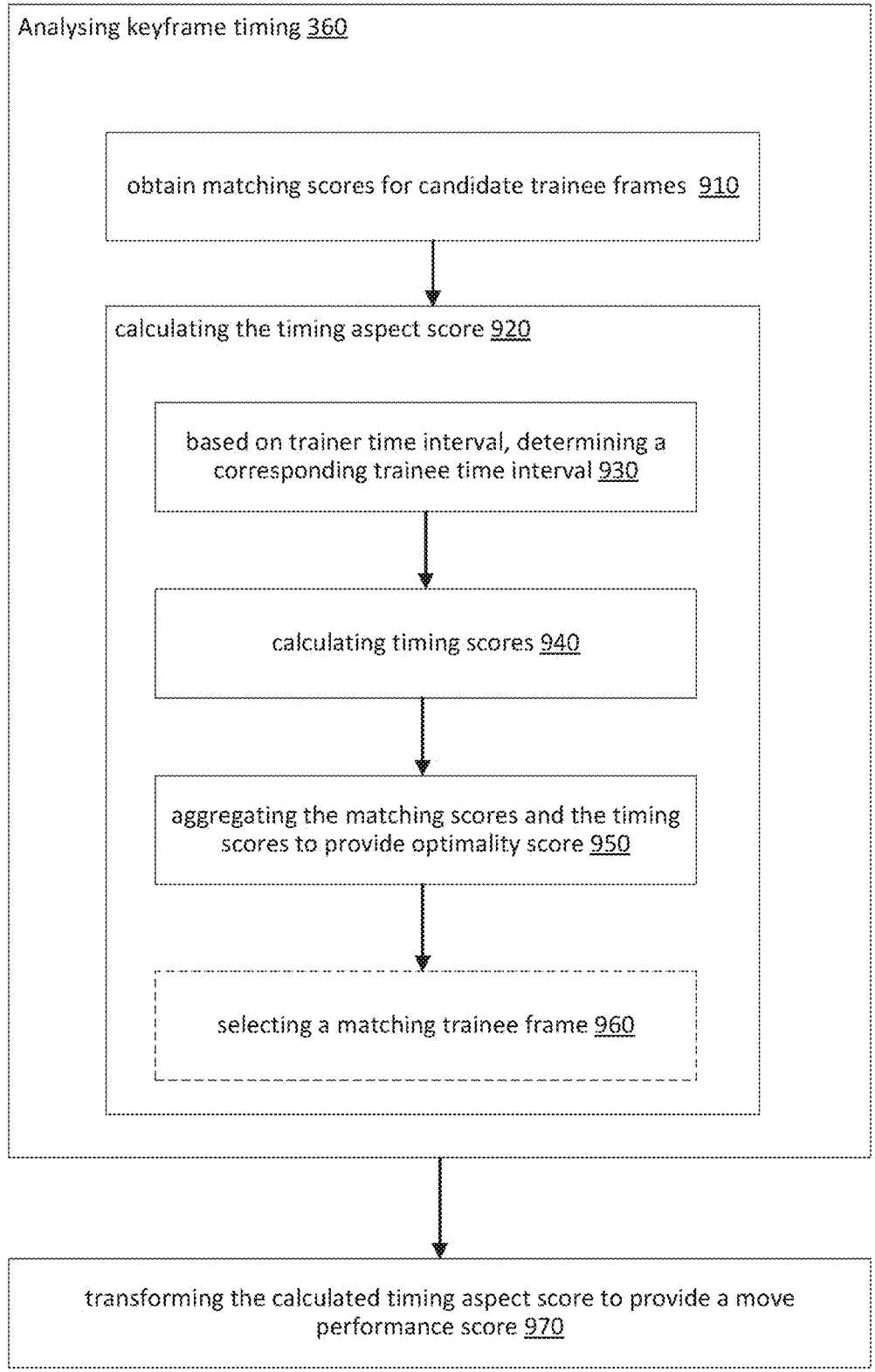
FIG. 9 illustrates a generalized flow chart of analysing keyframe timing, in accordance with certain embodiments of the presently disclosed subject matter.

Referring now to FIG. 9, there is illustrated a generalized flow chart of a timing analysis. In accordance with certain embodiments of the presently disclosed subject matter, the stage of analysing keyframe timing 360 comprises calculating an aspect score 340 block in FIG. 3. The stages illustrated in FIG. 9 can be performed e.g. by timing analysis module 260 appearing in FIG. 2.

As described above, the timing analysis assumes that candidate trainee frames have been selected for a trainer keyframe, and that each candidate has been processed to indicate a matching score to the trainer keyframe. Therefore, in some cases, timing analysis module 260 can obtain, for at least two candidate trainee frames, a respective matching score (block 910). The matching scores are indicative of a likelihood of match between the candidate and a trainer keyframe. In some examples, the matching score can be a similarity aspect score, as calculated by the similarity analysis module, as described above. However, those skilled in the art will readily appreciate that the obtained matching scores, are, likewise, applicable to matching scores calculated by other known per se techniques. With reference to FIG. 8, timing analysis module 260 can obtain the similarity scores of F3-F7 for matching KF1, and the similarity scores of F6-F10 for matching KF2.

Based on the obtained matching scores, timing analysis module 260 can calculate the timing aspect score (block 920). A trainer time interval from the trainer video can be obtained. The trainer time interval includes at least two trainer keyframes. With reference to FIG. 8, the trainer time interval can include time 00:01-00:08. Based on the trainer time interval, timing analysis module 260 can determine a corresponding trainee time interval in the trainee video (block 930). The corresponding trainee time interval includes at least two successive candidate trainee frames. The successive candidates have respective matching scores. In some examples, the determined trainee time interval includes the same time interval as that of the trainer interval, at the same appearance in time in the video. For example, with reference to FIG. 8, since the trainer time interval includes time 00:01-00:08 of the trainer video, the determined trainee time interval can also include time 00:01-00:08 of the trainee video.

In some examples, the trainer time interval can include the entire trainer video, and, accordingly, the entire trainee video. Yet, in some other examples, the trainee time interval can be determined based on trainer keyframes that were included in the trainer time interval. The trainee time interval is determined to include all the candidates that correspond to the trainer keyframes included in the trainer time interval. For example, with reference to FIG. 8, the trainer time interval may include time 00:01-00:06 comprising KF1 and KF2 of the trainer. The candidate trainee frames to KF1 and KF2 are F3-F10. Hence, a trainee time interval that includes F3-F10 is determined. In this case, the trainee time interval includes time 00:01-00:08. It should be noted that the determined trainee time interval may be of different length to that of the trainer time interval. In such examples, the candidates in the trainee time interval may be normalized, according to the difference in the time window size of the trainer keyframes and that of the candidates.

In some cases, timing analysis module 260 can calculate a timing score for the at least two successive candidate trainee frames, with respect to one or more timing parameters (block 940). The out-of-sync example described above is one example of a timing parameter. In some examples, the candidates keyframe can be scored in relation to other candidate frames. Assuming for example a first candidate to a first trainer keyframe, and second and third candidates for a second trainer keyframe. The first candidate is scored in relation to each of the second and third candidates.

Following is a non-exhaustive list of optional timing parameters. In some examples, a timing parameter may apply a constraint on a candidate trainee frame, e.g. a Boolean constraint, such that if a condition is met, a candidate cannot be selected as a matching frame. This can be achieved e.g. by providing a zero or the lowest optional timing score to a candidate, or by associating an n.a. indication to a candidate, such that no score is applicable for that candidate. In some other examples, a timing score is calculated for a candidate based on a timing parameter, and the timing score may later be aggregated with other aspect scores, e.g. a matching score. Some optional timing parameters include at least:

Matching scores of each candidate with respect to other candidates for other keyframes. This parameter is illustrated with respect to FIG. 10 below.

Time offset between a trainee frame and a trainer keyframe, according to which the time offset between the trainer keyframe and the candidate is calculated, and a substantially similar offset should be applied to all candidates with respect to the trainer respective keyframes. For example, with reference to FIG. 8, consider the first candidate to be F3 for trainer KF1, and the second and third candidates to be F6 and F7 for KF2. Considering the time offset parameter:

the time offset of F3 from KF1 is −2 seconds, the time offset of F6 from KF2 is −2 seconds, and that the time offset of F7 from KF2 is −1 seconds.

The timing offset score of F3 would be an array of scores, including a cell of offset score with a high offset score for F6 and a low offset score for F7. An exemplary matrix including scores of each frame with respect to other frames is described below with respect to FIG. 10.

maximum allowed time offset between a trainee frame and a trainer keyframe;

a time constraint not to match the same trainee frame to two different trainer keyframes;

minimal lag between two matching trainee frames that is higher than a predefined threshold, e.g. 50% threshold, of the distance of the trainer keyframes' lag. It is to be noted that the 50% threshold is only an example, and various thresholds can be determined and applied;

trainee frame time compared to trainer keyframe time—a higher timing score will be given to a frame with a time that is closer to the keyframe time;

Clipping keyframe scores below that are floored to a predefined value (for example a clipping threshold of 0.5 would mean a matching score of 0.3 is floored to 0.5).

The above examples should not be considered as limiting, and a those skilled in the art will readily appreciate that the teachings of the presently disclosed subject matter are, likewise, applicable to other examples of timing parameters.

Based on one or more parameters of the above, a timing score can be calculated for a candidate frame. For example, the timing score can be the score calculated for offset timing parameter and can be in absolute seconds, preserving the sign or some transformed value based on the raw difference (e.g. based on a non-linear kernel). In cases where the timing score is based on more than one timing parameter, the timing score can be calculated, e.g. by aggregating the timing score of some or all parameters. In case one or more of the parameters is associated with a weight, the timing score can be calculated based on the associated weight.

In cases where, for each trainer keyframe, only one candidate frame is selected from the trainee video, the timing analysis may be skipped, or may be performed under determination that synchronization exists between the trainer keyframes and the trainee frames, and provides an equal timing score for each of the trainee frames. However, in cases where several candidates are selected for one trainer keyframe, it may be advantageous to select one of the candidates as a matching trainee frame for each trainer keyframe. Hence, in some examples, after timing scores are calculated, the timing scores and the matching scores of each candidate frame can be aggregated to provide an optimality score (block 950). The optimality scores can be indicative of an optimal selection of a matching candidate to a trainer keyframe. In some examples, the timing score and the optimality score can be indicative of a score of a frame with reference to another frame. This is further described below with respect to FIG. 10.

After calculating an optimality score, in some examples, the candidate having the highest optimality score can be selected as a matching trainee frame for a trainer keyframe (block 960). In some cases, selecting a matching frame is performed where more than one aspect of performance is evaluated, e.g. when similarity analysis and timing analysis are processed. This selection is further illustrated in FIG. 10 below.

In some examples, a threshold may be determined for calculating optimality scores and selecting a matching candidate. In such examples, calculating optimality scores in the timing analysis can be performed only for candidates having a matching score above a predefined threshold. A reason is that if no frame is associated with a similarity score which is above a certain threshold, then there is no point in calculating optimality scores and selecting a matching frame based on the optimality scores. However, it is still advantageous to select a matching frame to each keyframe, e.g. to indicate of the error. Therefore, in such cases the matching frame may be selected based on one or more timing constraints, e.g. based on 'proximity to expected time' timing parameter and 'time offset' from the keyframe.

In some examples, after selecting a respective matching candidate for keyframes, a move performance score can then be calculated based on the calculated timing score, the optimality score, the matching scores or a combination thereof (block 970).

Reference is now made to FIG. 10 illustrating an exemplary matrix 1000 of applying timing parameters, calculating timing scores and optimality scores for each candidate frame, in accordance with certain embodiments of the presently disclosed subject matter. After timing scores are calculated, a respective matching trainee frame can be selected for the trainer keyframe.

The illustration of FIG. 10 provides an example of a timing score calculation based on several timing parameters. The first timing parameter to apply is aggregation of matching scores, for example, the matching scores of table 800 appearing in in FIG. 8. As illustrated in matrix 1000, each frame (F3-F10) is scored during the timing analysis stage, based on the matching score of the candidate to a trainer keyframe, and the matching score of each other candidate with respect to each other trainer keyframes.

For example, consider trainer keyframes KF1 and KF2 only. In table 800, F3 has a similarity score of 0.4 for similarity to trainer KF1. This similarity score is aggregated to each similarity score of any other candidates F6-F10 of KF2, resulting in the following aggregated scores for F3:

|    | F3  | F4  | F5  | F6  | F7  | F8  | F9  | F10 |
|----|-----|-----|-----|-----|-----|-----|-----|-----|
| F3 | n.a | n.a | n.a | 1.2 | 0.5 | 0.5 | 0.5 | 0.5 |

As shown in the above rows, F3-F5 were not candidates of KF2, hence, no scores could be aggregated and the aggregated scores for each of the cells F3/F3, F3/F4 and F3/F5 is denoted by n.a. F6 was scored with 0.8 for similarity score for KF2, hence, the aggregated score for cell F3/F6 is 1.2 (0.4+0.8). F7 was scored with 0.1 in similarity score for KF2, hence, the aggregated score for cell F3/F7 is 0.5 (0.4+0.1).

As mentioned above, some of the timing parameters may apply a constraint on a candidate trainee frame, e.g. a Boolean constraint, such that if a condition is met, a candidate cannot be selected as a matching frame. As illustrated in table 800, F7 was scored with 0.7 in similarity score for KF1 and F6 was scored with 0.8 in a similarity score for KF2, which should have been resulted in aggregated score 1.5 in cell F7/F6. However, out-of-sync parameter is applied to F7/F6, in this case, a constraint that the order of appearance of the trainee frames in the sequence of keyframes should be the same order of appearance of the trainer keyframes in the sequence, resulting in no aggregated score in cell F7/F6. For similar reasons, cell F7/F7 does not include an aggregated score. F7 was scored as both similar to KF1 and to KF2, however, a coincidence constraint prevents from a single frame to match two keyframes, hence, the cell of F7/F7 does not include an aggregated score. It is to be noted that the aggregated scores in FIG. 10 are indicative of scores of frames with reference to another frames.

The aggregated scores calculated based on the aggregated matching scores in the above F3 row are also the optimality scores for frame F3. As illustrated, Matrix 1000 illustrates the optimality scores for all candidates.

The optimality scores for each of cells F3/F6, F4/F6 and F5/F6 equals 1.2. The scores are marked in grey to indicate that these scores are the highest scores in the table. Each of these cells is indicative that selecting one of F3/F4/F5 for matching KF1 and selecting F6 for matching KF2 would yield the highest score for the trainee in overall view of the entire move. In the current, the highest optimality scores yield three equally suitable matchings. In these three matchings, trainee F6 is matched with trainer KF2, but the optimality score could equally well match trainee F3, F4, or F5 to trainer KF1.

In some other examples, additional constraints and/or timing parameters in the timing analysis may be applied to select one matching candidate. For example, in the case of equally optimal matches, the candidate with the closest time to the expected KF time is selected (in this case F5 is closest in time to trainer KF1 and hence and will have a higher score over F4. F4 in turn, will have a higher score over F3). Additional constraints can be added, as described above, on the minimum distance between consecutive selected candidate frames (assume at least 1 second difference), or similar time offset between keyframes and respective frames. Both of these constraints or timing parameters result in a higher optimality score and selection of F4 over F5 for matching KF1.

The timing scores for the selected matching frames F4 and F6 can be based on one timing parameter, e.g. the difference in the expected and actual times of the keyframes (F4 appeared 1 second sooner than KF1 and F6 appeared 2 seconds sooner than KF2).

In case additional similarity analysis is performed with respect to a second set of keyframes reflecting typical mistakes and/or possible variations, then the calculated modified similarity scores can be used in the above example, together with the similarity threshold, for calculating optimality scores of the candidate frames, to effectively provide a wide range of mistakes of the move in a flexible way.

It should be noted that the above timing analysis was described with respect to one trainer time interval. In some examples, once a first trainer time interval has been processed, candidates are scored, and, optionally, a matching frame is selected for each trainer keyframe in the time interval, the process proceeds by shifting the time interval to process the next trainer keyframes. In some examples, the time interval is shifted based on the distance between the last keyframe in the time interval, and the next successive trainer time interval. In some examples, selecting matching frames for each trainer keyframe, or some of the trainer keyframes, results in a sequence of selected matching frames for trainer keyframes. This sequence of frames, which are a subset of all frames in the trainee video or sequence or images, are the frames in which the trainee tried to imitate the moves of the trainer. Hence, selecting the matching frames, and reaching the sequence of selected frames, achieves to provide a more accurate feedback to the user, which will enable the user to improve his future moves.

In some examples, once a candidate frame is selected as a matching candidate and a move performance score is calculated based on the matching frames a more accurate and efficient feedback can be provided, as the feedback may rely on insights learned and focus on the matching frame and its score, compared to the trainer keyframe. Accordingly, feedback on how the trainee can improve the performance of a future move, when relying on the insights learned from that matching frame, can be provided to facilitate the trainee to improve performance of a future move with respect to the trainer move.

Attention is now reverted to a description of the motion dynamics aspect. While keyframe matching based on similarity and timing aspects may indicate the correctness of the move and its timing, the motion dynamics aspect relates to the style of the move and movement transformation between two trainer keyframes in a move. It should be noted that although the motion dynamics analysis is now described after performing the timing analysis, it should not be considered as limiting, and those versed in the art would realise that motion dynamics analysis can be performed before the timing analysis. Scores calculated during the motion dynamics analysis can be used as matching scores obtained by the timing analysis module 260, as an input to the timing analysis. The motion dynamics scores can be combined with other matching scores, such as calculated similarity scores, or may be used independently as matching scores.

In some cases, in order to process the move in relation to the motion dynamics aspect, successive trainer keyframes in a trainer video, and trainee frames in the trainee video, are processed. Motion features can be extracted from the two successive trainer keyframes and can be analysed in the trainee frames. For example, the velocity of joints' change in the move of the trainer can be compared to the velocity of joints' change in the move of the trainee. Other examples of motion dynamic features appear below.

Figure 11:
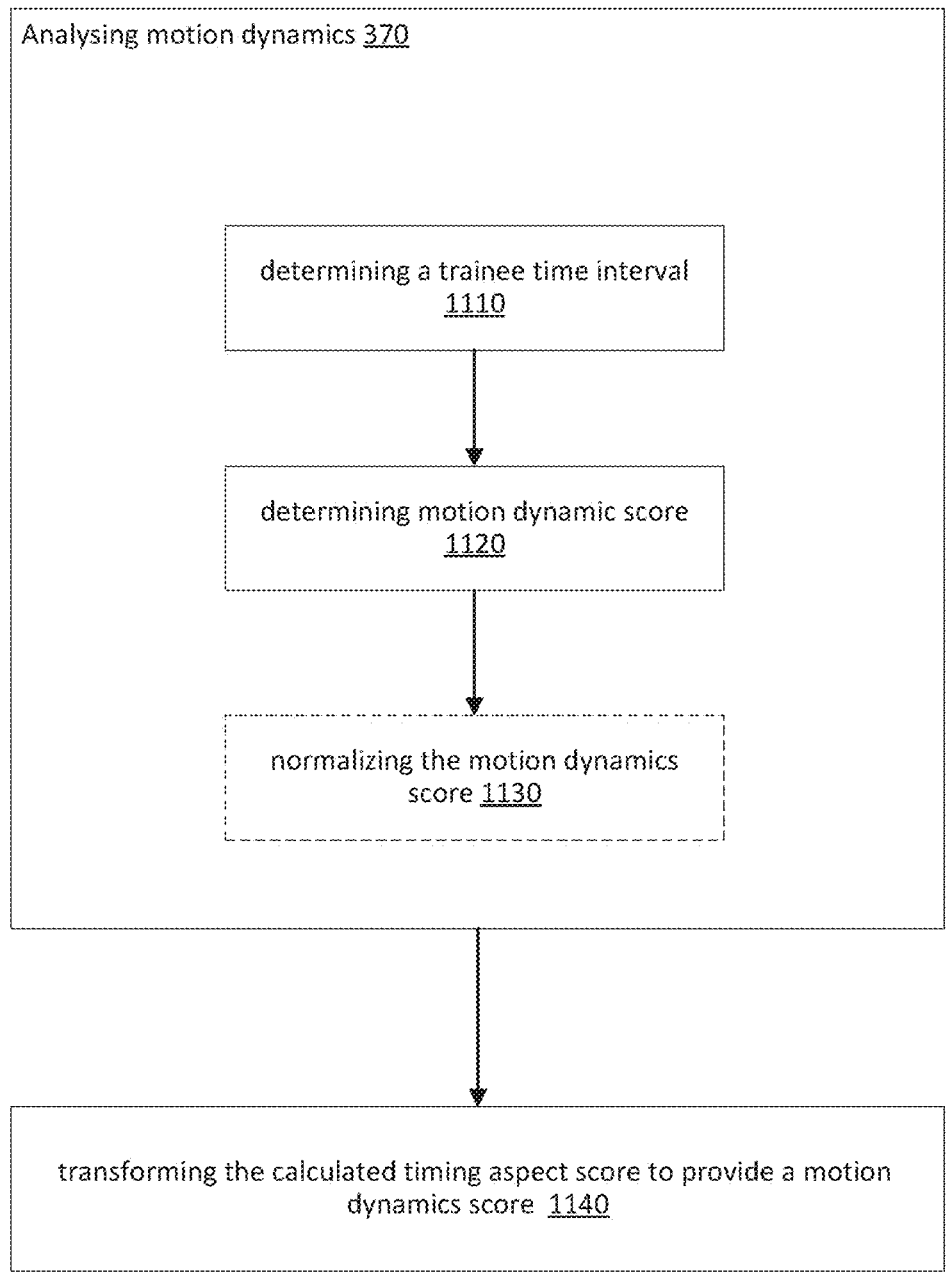
FIG. 11 illustrates a generalized flow chart of analysing motion dynamics, in accordance with certain embodiments of the presently disclosed subject matter.

Referring now to FIG. 11, there is illustrated a generalized flow chart of analysing motion dynamics 360 comprised in calculating an aspect score 340 block in FIG. 3, in accordance with certain embodiments of the presently disclosed subject matter. The stages can be performed e.g. by motion dynamics module 270 appearing in FIG. 2. A trainer time interval from the trainer video can be obtained. In some examples, a trainer time interval can include the entire trainer video, or a predefined portion thereof, e.g. as defined by the trainer. Alternatively, or additionally, the trainer video may be divided, to include a predefined number of trainer keyframes. In some examples, the trainer time interval may include at least two trainer keyframes.

Figure 12:
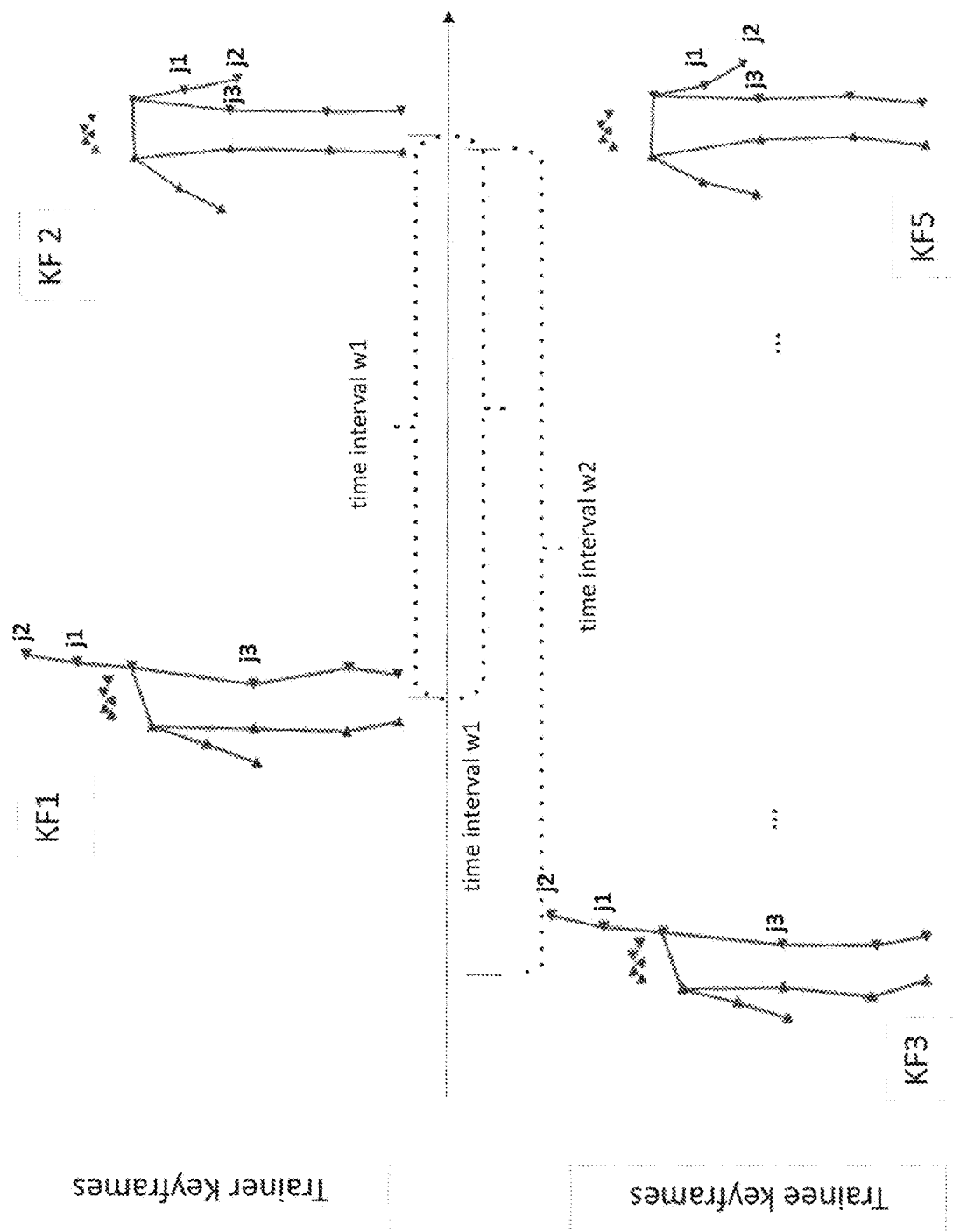
FIG. 12 illustrates exemplary videos including keyframes, in accordance with certain embodiments of the presently disclosed subject matter.

Based on the trainer time interval, motion dynamics module 270 can determine a corresponding trainee time interval in the trainee video (block 1110). Reference is made to FIG. 12 illustrating exemplary timelines of the trainer keyframes and the trainee frames in the respective videos. Trainer time interval is illustrated by time interval w1 from KF1 to KF2. Given a start and end timepoint of time interval w1, a respective start and end timepoints of a time interval in the trainee video can be determined, e.g. time interval w1 in the trainee video. In some examples, the determined trainee time interval includes the same time interval w1 as that of the trainer interval, at the same appearance of time in the video. In some examples, the trainee time interval includes at least two trainee frames.

Yet, in some other examples, the trainee time interval can be determined based on trainer keyframes that were included in time interval w1. In case matching frames have already been selected for each keyframe before motion dynamics analysis is performed, then the trainee time interval can be determined based on the matching frames, and can include at least the respective matching trainee frames to the trainer keyframes included in the time interval w1. With reference to FIG. 12, the respective matching trainee frames to KF1 and KF2 included in time interval w1 are F3 and F5. Hence, a corresponding time interval w2 is determined, which starts at time appearance of F3 and ends at time appearance of F5 in the trainee video. In some examples, the trainee time interval can be determined based on a combination of a fixed predefined size as well as the matching frames, where one point (either the starting or the end time) is determined based on the matching trainee frame, and the size of the time interval is determined based on an absolute predefined window size.

Motion features can be extracted from the trainer keyframes included in the trainer time interval. The motion features can relate to one or more of the following groups of features, or a combination thereof, and can be indicative of movement transformation between two keyframes:
- features extracted from the velocity of the joints, e.g. the velocity of change in the joints,
- features extracted from the relative motion patterns, e.g. features which compare how joints change in location relative to each other,
- features extracted from proximity patterns module, e.g. features which compare if joints are close to each other,
- features extracted from turn motion patterns module, e.g. features which compare the similarity of turns around a specified axis,
- features extracted with respect to activity level consideration, (the magnitude of change in location over successive frames, minimally from one frame to the next), including features extracted from a peak of a move. To illustrate a peak of a move, consider an example of a trainer move being a small kick. However, the trainee performed a strong kick. When analysing similarity in the keyframes, the beginning of the trainee motion, where the trainee just started to kick, may be considered as the best match of keyframe. However, the motion dynamics analysis includes analysing the peak of the move, resulting in finding the matching frame of the trainee to be the keyframe including the peak of the trainee strong kick. Despite this keyframe being less similar, it is more accurate, and providing feedback of this matching frame may assist the user in performing his future move in a more accurate manner.

The above list should not be considered as limiting, and those skilled in the art will readily appreciate that the teachings of the presently disclosed subject matter are, likewise, applicable to other motion features.

FIG. 12, illustrates movement transformation between two keyframes. The velocity of change in the position of joint j2 in KF1 to KF2 can be extracted, and compared to the velocity of change in the position of joint j2 in F3 to F5. If the velocity measured in the trainer keyframes is high, whereas the velocity measured in the trainee frames is low, then the difference can be indicative of low performance of the move in terms of the motion dynamics aspect, resulting in a low motion dynamics score. Another example of a motion feature includes measuring the change in distance between joint j1 and j3 in KF1 and the same distance in KF2, when compared to the change in distance of j1 and j3 in F3 and F5. If, for example, the change in the measured distance between j1 and j3 in trainer keyframes KF1 and KF2 is different from the change in measured distance between j1 and j3 in F3 and F5, then this can be indicative of low performance of the move. For example, the difference can indicate of a larger or smaller change. In some examples, the shape of timeseries of j1 and j3 distances between F3 and F5 can also be compared.

Referring back to FIG. 11, based on at least one motion feature extracted from the at least two trainer keyframes included in the trainer time interval, motion dynamics module 270 can determine a motion dynamics score for the matching trainee frames (block 1120. For example, one or more scores can be calculated with respect to one or more motion dynamics features, and be aggregated to provide a motion dynamics score.

Each of the trainer time interval and the corresponding trainee time interval may be associated with a window size. In some examples, the window size associated with the corresponding trainee time interval is different than the window size associated with the trainer time interval, as illustrated by time intervals w1 and w2 in FIG. 12. In some examples, in order to better compare motion dynamic features on the trainee frames the calculated motion dynamics score can be normalized according to the window sizes. In order to normalize the motion dynamics score, a difference between the window sizes of the trainer and corresponding trainee time intervals can be calculated. In accordance with the difference of window sizes, the respective motion dynamics scores of the matching trainee frames can be normalized (block 1130), e.g. using known per se techniques.

Figure 13:
FIG. 13 illustrates an example of evaluating a move based on several aspects, in accordance with certain embodiments of the presently disclosed subject matter.

Referring back to FIG. 3, the similarity analysis, timing analysis and motion dynamics analysis are three examples of aspects of the performance. The analysis of these aspects is described with respect to calculating an aspect score in block 340 in FIG. 3. As described above, each of the aspects can be applied independently of the other. Yet, the trainee frames can be analysed with respect to more than one aspect. Reference is made to FIG. 13 illustrating implementation of analysing the trainee frames according to the three aspects. As illustrated in table 1300, the trainer video includes two keyframes KF1 and KF2. The trainee video includes trainee frames F3-F10. Based on trainer keyframes KF1 and KF2, a time window of +/−2 seconds with respect to trainer keyframes is selected. Accordingly, candidate trainee frames F3 to F10 are selected.

A similarity analysis is then performed to F3-F10, and a similarity score is computed for each F3-F10, as illustrated in the similarity score with respect to KF1 and KF2. As illustrated, F6 and F7 are candidates of both KF1 and KF2, and can yield different similarity scores for different trainer keyframes. Also to be noted, is that, based on the similarity scores, F7 has the highest similarity score for KF1, and F6 has the highest similarity score for KF2.

Next, motion dynamics analysis is then performed to F3-F10. In this example, motion magnitude similarity feature is performed, to consider the peak of the motion of the trainee. Motion magnitude scores are listed in table 1300.

The scores of the dynamic motion analysis and the similarity analysis can be aggregated, referred to in table 1300 as 'similarity score for KF1+motion magnitude similarity' and 'similarity score for KF2+motion magnitude similarity'.

In some examples, the aggregated scores illustrated in table 1300 can constitute matching scores for next to be performed timing analysis. F4 and F6 have the highest matching scores for KF1 and KF2.

Next, timing analysis is performed for a more holistic process of the frames. The timing analysis may add constraints of the selection of matching frames, or compute a low timing score for the frames, resulting in different selection of matching frames when timing aspects is further processed. For example, the timing analysis can include a constraint of out-of-sync keyframes, offset parameters and such.

In the example of 1300, the timing constraints that are applied (now shown) do not change the scores, and as such, F4 and F6 remain as having the highest scores, now being optimality scores for F4 and F6. These frames can be selected as matching to KF1 and KF2 respectively. The timing scores of F4 and F6 can be based on offset timing parameter to be −1 and −2, respectively.

The scores calculated for F3 and F6 for the various aspects can be fused to provide a move performance score and a suitable feedback.

It should be noted that the above is merely an example of the order of performing the aspects analysis. A different order of execution can be determined, e.g. based on the type of the move that the trainee tries to imitate. For example, for freestyle dances, it may be advantageous to select a different order, such that first the motion activity level is evaluated to calculate a motion dynamics score, then the timing analysis is evaluated based on the scores of the motion dynamics (constituting the matching scores for the timing analysis). Once the matching candidates are selected in the timing analysis, only then, keyframe similarity aspect scores are calculated for the matching frames. A move performance score can then be calculated based on the calculated scores, and a suitable feedback can be provided.

Referring back to FIG. 3, once one or more aspects scores are calculated, PMC 210 can transform the calculated aspect scores, giving rise to the move performance score (block 380). Based on the move performance score, feedback to the trainee can be provided, whereby the feedback that was provided to the trainee facilitates the trainee to improve the performance of a future move with respect to the trainer move.

In some examples, the similarity, timing and motion dynamics analysis provide indication on different aspects of the performance of the move. Transforming the computed scores of the aspects into a move performance score, based on which feedback is provided, is advantageous, since the aspect scores may be translated to high-level concepts of accuracy, timing, and style. The feedback may then be focused on specific aspects according to the scores, such that it facilitates the trainee to improve his/her performance. Thus, the learning process of the trainee imitating a trainer may go through different qualitative stages.

In cases where only one aspect is evaluated, a move performance score can be calculated based on transformation of the scores calculated for each feature or parameter in that aspect. For example, average, geometric mean or based on a learned method considering the individual scores informativeness can be performed to transform the scores into a move performance score.

In cases where trainee frames are processed in relation to more than one aspect, transforming the scores to provide a motion dynamics scores include fusing the scores of the various aspects (block 390). In some examples, in order to fuse one or more aspect scores, the scores of the matching frames and/or transformations thereof can be aggregated. In some other examples, the aggregation can be conditional, such that the transformation function of one calculated aspect score is determined or weighted based on one or more conditions pertaining to another calculated aspect score of a second aspect. The conditional aggregation is advantageous to provide a more accurate move performance score, since, as explained further below, different weights may be given to different aspects, depending on the scores of the aspects. For example, if no trainee frame is scored with a high similarity score, there is no relevancy to the timing, and hence the timing scores and motion dynamics score may be weighted with zero. In some examples, one or more weights for one or more aspects can be predefined.

Alternatively or additionally, the fusion of the aspects scores may include creating a summarization function, which depends on the aspects scores, or a combination thereof. One example of combining the aspects scores includes a three parameter function, for example:

If similarity score > first threshold
then
    motion dynamics score= w1*similarity aspect score+w2*timing aspect score+w3*motion dynamics score
else
    motion dynamics score = w3* similarity aspect score
where w1, w2 and w3 are predefined weights.

In another example the following function can be applied:

w1*similarity aspect score+w2*1*timing aspect score+w3 motion dynamics score.

Therefore, not only a hard 'if' threshold can be used but a lower threshold, including a logistic function, can also modulate the effect of one aspect score on another.

The fusion functions can be predefined and applied when necessary, or can be learned, using known per se machine learning modules.

In some examples, based on the move performance score feedback is provided to the trainee, such that feedback facilitates the trainee to improve the performance of a future move with respect to the trainer move (block 392). In some examples, the calculated aspect scores, providing the move performance score, can be used in providing the feedback to the trainee. In some examples, one or more feedbacks can be selected from predefined feedbacks. For example, a list of predefined semantic feedbacks can be stored in memory 220 in FIG. 2.

As explained above, in some cases, the analysis of the trainee move results in metrices including aspects scores, e.g. after performing a similarity analysis including a frame matching, timing analysis, and motion dynamics analysis. In some examples, these metrices are aggregated to generate a motion performance score.

Determining and selecting one or more feedbacks from a list of predefined feedbacks, to provide to the trainee, can be done in accordance with one or more rules. Below are some non-limiting examples of rules:

Selection of one or more general success/failure feedbacks can be made based on predefined thresholds on the calculated motion performance score. For example, defining 0.3 as the minimum threshold could result in a "Missing move" feedback for a move score of 0.25. Additionally, defining a 0.8 threshold could be used to generate a "Perfect move" feedback for a score of 0.9.

Selection of one or more feedbacks can be made based on predefined thresholds on calculated aspect scores. Feedback based on aspects scores may provide a wider overview on progress in different facets of the learning move. For example, a threshold on the timing score, and any sign of differences between from the threshold compared to the score, can be the basis of feedbacks such as "slow down" or "hurry up".

Selection of one or more feedbacks can be made based on one or more conditions relating to scores of the various aspects. For instance, a condition specifying a high keyframe similarity score (x>0.9) and a high timing score (x>0.9) together with a lower score for motion dynamics aspect (0.5>x>0.0) can be used as the basis of feedbacks, such as "You know now the gist of the motion, pay attention to its stylistic aspects".

The above examples should not be considered as limiting, and a those skilled in the art will readily appreciate that the teachings of the presently disclosed subject matter are, likewise, applicable to other examples of predefined conditions on how to select a feedback to the trainee.

In embodiments of the presently disclosed subject matter, fewer, more and/or different stages than those shown in FIGS. 3, 6, 9 and 11 may be executed. In embodiments of the presently disclosed subject matter, one or more stages illustrated in FIGS. 3, 6, 9 and 11 may be executed in a different order and/or one or more groups of stages may be executed simultaneously. For example, stages 350, 360 and 370 can be processed in a reverse order, or simultaneously. In addition, stages 610 and 620 can be processed in a reverse order, or simultaneously.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A computerized method for scoring performance of a move of a trainee in a trainee frame input in relation to a move of a trainer in a trainer video, wherein the trainer move includes at least one trainer keyframe, the method comprising:
    obtaining a trainee frame input comprising a trainee move, the trainee move comprising a plurality of unnormalized trainee frames;
    based on the at least one trainer keyframe, processing the plurality of unnormalized trainee frames to provide a move performance score, indicative of the performance of the trainee move in relation to the trainer move, with respect to at least one aspect of the performance, the processing comprising:
        selecting for the at least one trainer keyframe, according to a selection criterion, at least one unnormalized trainee frame of the plurality of trainee frames that correspond to the at least one trainer keyframe, giving rise to at least one candidate;
        based on the at least one trainer keyframe and the at least one candidate, calculating at least one aspect score of the at least one aspect;
        transforming the at least one calculated aspect score, giving rise to the move performance score; and
    based on the move performance score, providing feedback to the trainee;
    whereby, the provided feedback facilitates the trainee to improve performance of a future move with respect to the trainer move.

2. The computerized method of claim 1, wherein the selection criterion is a time criterion, and wherein selecting the at least one trainee frame comprises selecting at least one candidate in a time window in the trainee frame input that is around a time point of the at least one trainer keyframe in the trainer video.

3. The computerized method of claim 1, wherein the at least one aspect is a similarity aspect, and wherein the at least one trainer keyframe includes body parts of the trainer and the at least one candidate includes body parts of the trainee, and wherein calculating the similarity aspect score further comprises:
    computing at least one angular difference between at least one body part included in the at least one trainer keyframe and at least one corresponding body part included in the at least one candidate; and
    calculating the similarity aspect score, based on the computed at least one angular difference.

4. The computerized method of claim 3, wherein computing the angular differences comprises computing at least one parameter selected from a group of parameters comprising: absolute angular difference, cosine distance, and a learned distance.

5. The computerized method of claim 3, wherein the at least one trainer keyframe is associated with a predefined keyframe format, the method further comprising:
    pre-processing the at least one candidate in accordance with the predefined keyframe format, giving rise to at least one formatted candidate, such that the at least one formatted candidate is formatted according to the predefined format; and
    computing the angular differences between the body parts in the at least one trainer keyframe and body parts in the at least one formatted candidate.

6. The computerized method of claim 3, wherein at least one body part of the at least one body part of the trainer is associated with a respective weight, and wherein the method further comprises:
    computing the angular difference between the at least one body part and at least one corresponding body part of the trainee; and
    associating the computed angular difference with the respective weight; and
    calculating the similarity aspect score, based on the computed angular difference, according to the associated respective weight.

7. The computerized method of claim 1, wherein the trainer move includes at least two trainer keyframes, wherein the at least one aspect is a timing aspect pertaining to the at least two trainer keyframes, and wherein prior to calculating the timing aspect score, the method further comprises:
    obtaining, for each of the at least two candidates, a respective matching score, the matching score being indicative of a likelihood of match between a candidate and a trainer keyframe; and
    wherein calculating the timing aspect score further comprises:
        based on a trainer time interval in the trainer video, the trainer time interval includes the at least two trainer keyframes, determining a corresponding trainee time interval in the trainee frame input, the corresponding trainee time interval including at least two successive candidates having respective matching scores, and calculating a timing score for the at least two successive candidates, with respect to one or more timing parameters;

wherein transforming the calculated timing score further comprises fusing the matching scores and the calculated respective timing score of the candidates, giving rise to the move performance score.

8. The computerized method of claim 7, wherein the timing parameter is an out-of-sync parameter pertaining to an order of appearance of the at least two trainee frames in the sequence when compared to an order of appearance of the at least two trainer keyframes, and wherein calculating the respective timing score further comprises:

determining, for at least two trainee frames of the sequence of keyframes, an out-of-sync parameter score, and calculating the timing score of each respective trainee frame based on at least the determined out-of-sync parameter scores.

9. The computerized method of claim 7, wherein the timing parameter is a time offset parameter, wherein a time offset that pertains to an offset between a time that a trainer keyframe appears in the trainer video, and a time that the candidate appears in the trainee frame input, and wherein calculating the respective timing score further comprises:

determining for a trainer keyframe and a corresponding candidate a time offset; and calculating the timing score based on the determined time offset scores.

10. The computerized method of claim 7, wherein the at least one matching score is a similarity aspect score.

11. The computerized method of claim 7, wherein the at least one matching score is a motion dynamics score.

12. The computerized method of claim 7, wherein calculating the timing score is based on at least two timing parameters, wherein at least one of the timing parameters is associated with a weight, and wherein calculating the timing score further comprises calculating the timing score based on the associated weight.

13. The computerized method of claim 7, prior to fusing the matching score and the timing score, the method further comprises:

with respect to at least one candidate of the at least two successive candidates, aggregating the obtained matching score and the calculated timing score of the candidates to provide an aggregated optimality score;

for at least one trainer keyframe, selecting a matching trainee frame by selecting one candidate having a highest aggregated optimality score; and fusing the matching score and the timing score of the matching trainee frames, giving rise to a move performance score.

14. The computerized method of claim 1, wherein the trainer move includes at least two trainer keyframes, and wherein at least one aspect being a motion dynamics aspect, and wherein:

based on a trainer time interval included in the trainer video, the trainer time interval includes the at least two trainer keyframes, determining a corresponding trainee time interval in the trainee frame input, the determined corresponding trainee time interval including at least two trainee frames;

based on at least one motion feature extracted from the at least two trainer keyframes included in the trainer time interval, determining a motion dynamics score for the at least two trainee frames;

wherein the at least one motion feature is indicative of movement transformation between two keyframes.

15. The computerized method of claim 14, wherein at least one trainer keyframe of the at least two trainer keyframes is associated with a respective matching trainee frame, and wherein the determined corresponding trainee time interval includes at least one matching trainee frame to the at least two trainer keyframes.

16. The computerized method of claim 14, wherein each of the trainer and corresponding trainee time intervals is associated with a window size, wherein the window size associated with the corresponding trainee time interval is different to the window size associated with the trainer time interval;

calculating a difference between the window sizes of the trainer and corresponding trainee time intervals;

normalizing the trainee frames included in the trainee time interval in accordance with the calculated difference; and determining the at least one motion feature in the normalized trainee frames.

17. The computerized method of claim 14, wherein the at least one motion feature is selected from a group of features comprising: peak motion feature, velocity motion feature, pose motion feature, relative change motion feature, and turn motion feature.

18. The computerized method of claim 1, wherein processing the plurality of trainee frames to provide the move performance score is done with respect to at least first and second aspects, and wherein transforming the at least first and second calculated aspect scores further comprises:

for at least the first calculated aspect score of the first aspect, determining a respective transformation function, the transformation function being determined based on one or more conditions pertaining at least to the second calculated aspect score of the second aspect; and fusing the at least first and second aspects scores, based on the respective transformation functions, giving rise to the move performance score.

19. A system for scoring performance of a move of a trainee in a trainee frame input in relation to a move of a trainer in a trainer video, wherein the trainer move includes at least one trainer keyframe, by a processor and memory circuitry (PMC), the processor being configured to:

obtain a trainee frame input comprising a trainee move, the trainee move comprising a plurality of unnormalized trainee frames;

based on the at least one trainer keyframe, process the plurality of unnormalized trainee frames to provide a move performance score, indicative of the performance of the trainee move in relation to the trainer move, with respect to at least one aspect of the performance, the process comprising:

selecting for the at least one trainer keyframe, according to a selection criterion, at least one unnormalized trainee frame of the plurality of trainee frames that correspond to the at least one trainer keyframe, giving rise to at least one candidate;

based on the at least one trainer keyframe and the at least one candidate, calculate at least one aspect score of the at least one aspect; and transform the at least one calculated aspect score, giving rise to the move performance score; and based on the move performance score, provide feedback to the trainee;

whereby, the provided feedback facilitates the trainee to improve performance of a future move with respect to the trainer move.

20. A non-transitory computer readable storage medium tangibly embodying a program of instructions that, when executed by a computer, cause the computer to perform a method for scoring performance of a move of a trainee in a trainee frame input in relation to a move of a trainer in a trainer video, wherein the trainer move includes at least two trainer keyframes, the method comprising:

obtaining a trainee frame input comprising a trainee move, the trainee move comprising a plurality of unnormalized trainee frames;

based on the at least one trainer keyframe, processing the plurality of unnormalized trainee frames to provide a move performance score, indicative of the performance of the trainee move in relation to the trainer move, with respect to at least one aspect of the performance, the processing comprising:

selecting for the at least one trainer keyframe, according to a selection criterion, at least one unnormalized trainee frame of the plurality of trainee frames that correspond to the at least one trainer keyframe, giving rise to at least one candidate;

based on the at least one trainer keyframe and the at least one candidate, calculating at least one aspect score of the at least one aspect; and transforming the at least one calculated aspect score, giving rise to the move performance score; and based on the move performance score, providing feedback to the trainee;

whereby the provided feedback facilitates the trainee to improve performance of a future move with respect to the trainer move.

\* \* \* \* \*